United States Patent
Ruiz-Meraz et al.

(10) Patent No.: US 11,201,936 B2
(45) Date of Patent: Dec. 14, 2021

(54) INPUT AND OUTPUT SCHEMA MAPPINGS

(71) Applicant: MICROSOFT TECHNOLOGY LICENSING, LLC, Redmond, WA (US)

(72) Inventors: Cesar M. Ruiz-Meraz, Bothell, WA (US); Venkata RajaGopal Ravipati, Redmond, WA (US); Jayaraman Kalyana Sundaram, Redmond, WA (US); Hillary Caituiro Monge, Redmond, WA (US); Ashraf Hamad, Woodinville, WA (US); Bahram Banisadr, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/892,890

(22) Filed: Jun. 4, 2020

(65) Prior Publication Data

US 2020/0304583 A1  Sep. 24, 2020

Related U.S. Application Data

(63) Continuation of application No. 15/991,350, filed on May 29, 2018, now Pat. No. 10,681,164.

(60) Provisional application No. 62/666,477, filed on May 3, 2018.

(51) Int. Cl.
| | |
|---|---|
| *H04L 29/08* | (2006.01) |
| *G06F 9/54* | (2006.01) |
| *H04L 12/18* | (2006.01) |
| *G06F 16/21* | (2019.01) |

(52) U.S. Cl.
CPC ............ *H04L 67/26* (2013.01); *G06F 9/542* (2013.01); *G06F 16/211* (2019.01); *H04L 12/1859* (2013.01); *H04L 67/1097* (2013.01)

(58) Field of Classification Search
CPC ...... G06F 16/27; G06F 16/275; G06F 16/254; G06F 2119/12; G06F 16/211; G06F 16/86
See application file for complete search history.

(56) References Cited

U.S. PATENT DOCUMENTS

| | | | | |
|---|---|---|---|---|
| 8,738,704 | B2 * | 5/2014 | Stark | H04L 12/66 709/205 |
| 2002/0035482 | A1 * | 3/2002 | Coble | G06Q 50/10 705/1.1 |
| 2016/0055018 | A1 * | 2/2016 | Usgaonkar | G06F 9/45554 718/1 |

(Continued)

*Primary Examiner* — Chirag R Patel
(74) *Attorney, Agent, or Firm* — Workman Nydegger

(57) ABSTRACT

Optimizations are provided for interconnecting event sources with event subscribers in a seamless manner so that the native formatting/schema methodologies used by event sources and subscribers will not need to be natively modified. An event grid service is provided as a routing and mapping service. This event grid service receives event data that may be organized in any kind of format. By analyzing the format, the event grid service determines whether the format correlates with a format used by a consumer of that event data. If the formats conform, then the event grid service extracts relevant data from the event data and pushes it to the subscriber. If the formats do not conform, the event grid service intelligently generates a mapping to map the two formats together.

19 Claims, 16 Drawing Sheets

(56) References Cited

U.S. PATENT DOCUMENTS

| | | | |
|---|---|---|---|
| 2016/0147796 A1* | 5/2016 | Ardila | G06F 16/211 707/756 |
| 2019/0377807 A1* | 12/2019 | Dean | G06F 16/211 |

* cited by examiner

*1500*

1505
Receive An Event Publication That (1) Corresponds To An Established Topic, (2) Is Received From A Publishing Service And (3) Includes Event Data

1510
Use A Mapping Associated With Both The Topic And The Publishing Service To Translate Some Of The Event Data So That The Event Data Correlates To Fields Included Within An Event Schema For The Topic

1515
After Translating The Event Data, Identify A Subscriber That Is To Be Notified When Certain Types Of Event Data Included Within Any Event Publications Corresponding To The Established Topic Are Received

1520
Filter Certain Event Data From The Event Data

1525
Pushing The Filtered Event Data To The Subscriber

*Figure 15*

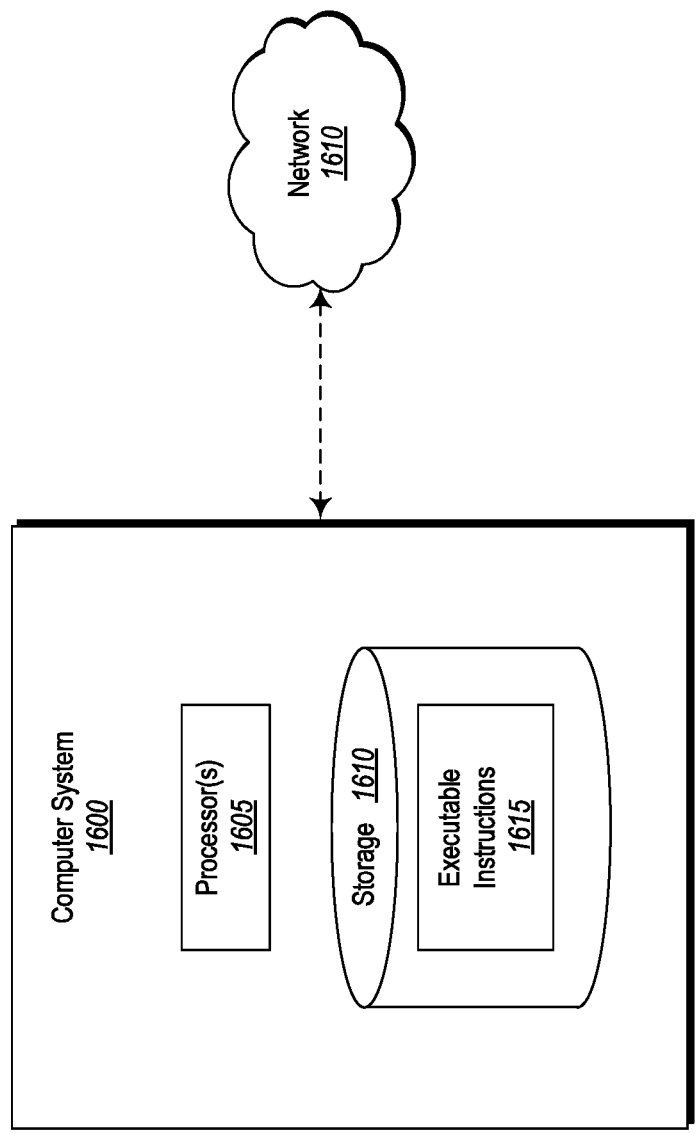

INPUT AND OUTPUT SCHEMA MAPPINGS

CROSS-REFERENCE TO RELATED APPLICATIONS

This application is a continuation of U.S. patent application Ser. No. 15/991,350 filed on May 29, 2018, entitled "INPUT AND OUTPUT SCHEMA MAPPINGS," which will issue as U.S. Pat. No. 10,681,164 on Jun. 9, 2020, and which claims the benefit of and priority to U.S. Provisional Patent Application Ser. No. 62/666,477 filed on May 3, 2018 and entitled "INPUT AND OUTPUT SCHEMA MAPPINGS," both of which applications are expressly incorporated herein by reference in their entirety.

BACKGROUND

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

Cloud and remote based service applications are prevalent. Such applications may be hosted on public and private remote systems (such as clouds) and usually offer a set of web-based services for communicating back and forth with clients.

One benefit of interconnecting computing systems (e.g., in the cloud) is that some entities can be notified when certain events transpire. For example, systems are currently in place to enable human subscribers to automatically receive information, such as the news. While some notification systems are currently available, these systems have many drawbacks and deficiencies. For example, because services and applications often use their own formatting or communication protocols, it can be a very time intensive and laborious process to interconnect multiple applications and services. As such, conventional techniques for linking these applications and services are very rigid and fail to provide flexibility for expansion, scalability, and future interconnections. Furthermore, many conventional event notification methodologies are configured primary for human subscribers. As a result, there is a substantial need to provide a flexible and reliable system for notifying any type of subscriber and for including scalability functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments are directed to systems and methods for managing events and, even more particularly, for systems and methods for interconnecting applications, services and entities. In some instances, this includes programmatically processing non-conforming data to be conforming. In other instances, this includes pushing event data from one or more publishing services to one or more subscribers.

For instance, in some embodiments, methods and system are provided for processing non-conforming data. These embodiments include various acts, such as the initial act of receiving registration information through an event grid service. This information is useful to establish a relationship between (i.e. register) a publishing service with the event grid service. To help with the registration process, the registration information includes details regarding how the publishing service formats its data (i.e. the schema it uses for formatting). This information is also associated with a topic to which subscribers are listening. The event grid service then analyzes the publishing service's event schema to determine whether that schema correlates to a default schema used for the topic. If there is no correlation or if there is only a partial correlation, then the event grid service is able to automatically derive a mapping that attempts to map the publishing service's schema to the topic's default schema. After this mapping is derived, the event grid service receives event publications from the publishing service. Thereafter, the event grid service uses the mapping to translate data in the publication in a manner so that the data properly maps to the event fields included in the topic's default event schema. This process enables the publishing service and the subscriber to be linked together, even when the publishing service publishes content that is non-conforming to a subscriber format, and without requiring either of those entities to alter or modify their native formatting techniques.

In some embodiments, systems and methods are provided to push event data from one or more publishing services to one or more subscribers of that event data through the event grid service. In particular, after receiving an event publication associated with a topic, a subscriber who is interested in that topic can be identified. In some instances, (1) the subscriber has a subscription with the event grid service, (2) the subscription identifies the types of event data that the subscriber is desirous to be notified of, and (3) the event data included in the publication actually includes relevant information for the subscriber. In some instances, a determination is also made as to whether the event data is in a conforming schema for the subscriber. If it is, then no mapping is performed. If it is not, a mapping process is performed on the event data. The relevant data is then filtered/extracted from the other portions of the event data, and it is then pushed to the subscriber.

In some embodiments, systems and methods are available for receiving event publications from publishing services and for pushing certain information to subscribers of that information. Initially, the event grid service receives (e.g., from a publishing service) an event publication that corresponds to an established topic and that includes event data. Through the use of a mapping, the event grid service is able to map some of the event data so that it maps to fields in an event schema that has been established for the topic. After this mapping is complete, a subscriber of this information can be notified when relevant event data (such as the data described above) is received. Here, the subscriber has a subscription with the event grid service, where the subscription identifies what type of data the subscriber wants to be notified of. The mapped data includes specific data that corresponds to the information that the subscriber wants to receive. Subsequently, the relevant data can be segregated from non-relevant data and then pushed to the subscriber.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 also shows that the service may operate using its own input/output schema.

FIG. 7 also shows that the event grid service is able to perform a front-end translation/correlation process.

FIG. 15 illustrates a flowchart of an example method for receiving event publications from one or more publishing services and for pushing information included within the event publications to one or more subscribers.

FIG. 16 illustrates an example computer system configured to perform any of the operations described herein.

DETAILED DESCRIPTION

Figure 1:
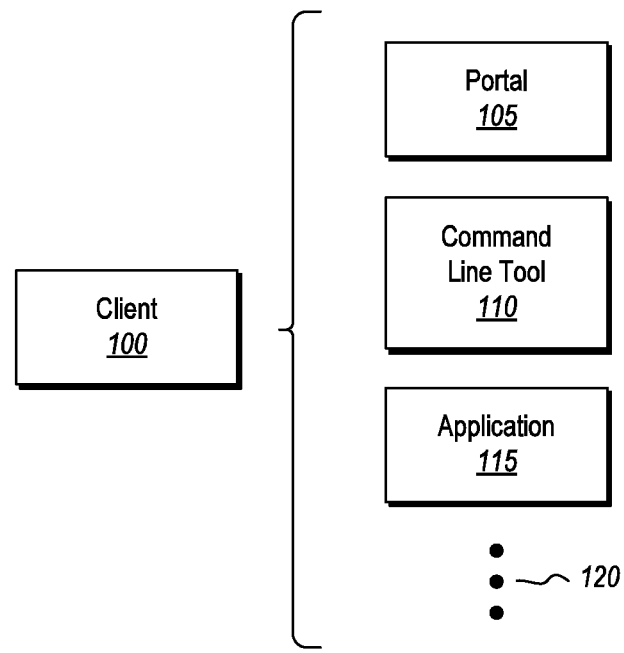
FIG. 1 demonstrates the various forms that a client may take.

Some of the disclosed embodiments relate to systems and methods that enable an event grid service to intelligently derive a mapping so that event data organized in one format can be translated into a different format. In this regard, the event grid service is able to identify and convert many different types of input formats into many different types of output formats. By performing these operations, significant advantages are realized because any number of different applications and services may be interconnected without requiring those services and applications to alter or modify their native formatting methodologies.

In some embodiments, the event grid service detects when event data, which is organized in a particular format, is received and then determines whether that format conforms with an existing format. If it does conform with the existing format, then the event grid service need not perform a translation process using a derived mapping. If, however, the particular format does not conform or only partially conforms, then the event grid service intelligently derives a mapping which is then used to translate the event data so that it corresponds to the data fields in the existing format. As will be described later, deriving this mapping and performing this translation are both performed in an intelligent way and can be based on many different factors.

In some embodiments, event data can be pushed to subscribers of that event data. For instance, event data for a particular topic may be received. After identifying the topic and the data, an appropriate subscriber (i.e. a subscriber who has expressed interest in this topic through a registration process) can be notified regarding the event data. If the event data is arranged in a schema suitable for the subscriber, then no mapping will be performed. If it is not, however, then a mapping process will be performed on the event data to ensure that the data is formatted in accordance with the subscriber's requirements. Thereafter, some (or all) relevant data is then pushed to the subscriber.

In some embodiments, systems and methods are available for receiving event publications from publishing services and for pushing certain information to subscribers of that information. Initially, the event grid service receives (e.g., from a publishing service) an event publication that corresponds to an established topic and that includes event data. Through the use of a mapping, the event grid service is able to map some of the event data so that it maps to fields in an event schema that has been established for the topic. After this mapping is complete, a subscriber of this information can be notified when relevant event data (such as the data described above) is received. Here, the subscriber has a subscription with the event grid service. This subscription (as will be described in more detail later) identifies what type of data the subscriber wants to be notified of. The mapped data includes specific data corresponding to the information that the subscriber wants to receive. Subsequently, the relevant data can be segregated from non-relevant data and then pushed to the subscriber.

As described earlier, traditional notification and mapping techniques are highly rigid and inflexible because they require a strict schema that fails to promote interoperability with other applications and systems. In contrast, the disclosed embodiments are highly dynamic and provide a flexible option for interconnecting subscribers with publishing services. As a result, any number of entities may be interconnected in a seamless manner and without requiring those entities to be altered or modified. Furthermore, because the event grid service is able to store previous mappings, the event grid service is able to learn from those existing mappings when deriving new mappings. In this regard, the event grid service may utilize machine learning to enhance or otherwise improve the mapping derivation process.

Having just described some of the embodiments and some of the advantages at a high level, attention will now be directed to FIG. 1 which illustrates some of the various forms that a client may take. Following that discussion, attention will be directed to FIGS. 2 and 3 which describe some of the attributes of a publishing service. Next, FIGS. 4 through 12 will be discussed. These figures describe various architectures and supporting illustrations related to how the event grid service operates. Following that discussion, attention will be directed to FIGS. 13 through 15 which describe various example methods on how the event grid may process event publications. Finally, FIG. 16 will be presented. This figure describes an example computer system that may be configured to perform any of the disclosed operations.

Clients and Services

Cloud operations are typically built by composing or interconnecting multiple different services or applications. As an example, an application may be configured to use a service to store files, to perform fast key value lookups, and to host specific business logic. In some circumstances, any number of these services or applications may have its own custom application logic, data formatting technique, or communication protocol. Because of these differing configurations, it is often a very laborious and time consuming endeavor to interlink these entities together. The disclosed embodiments satisfy these needs (as well as others) by delivering a flexible and highly dynamic event-driven architecture capable of providing a high degree of interoperability between any number of services and applications.

When these services and applications perform work, they often trigger the creation of an event. An event is the smallest amount of information that fully describes some action or operation that is taking place in a system. Examples of events include, but are not limited to, the creation of a file, table, directory, or database (e.g., on a computer, in an internal network, or in the cloud); the modification of those constructs (i.e. the file, table, etc.); the deletion of any of those constructs; or any other detectable occurrence that is recognizable by hardware or software (e.g., a service running in the cloud is able to execute and/or detect events). Events typically include information such as, but not limited to, an identification of the source that generated the event, a time when the event took place or was created, or a unique identifier for the event.

In some embodiments, an event also includes specific information relevant only to the particular action or operation that spawned the event. For example, if an event is triggered when a new file is created in a file directory or storage, then that event may contain specific details about the file, the file's metadata, the file's location, and so on. If an event is triggered when a virtual machine (VM) reboots (or performs some other type of operation), then that event may contain specific information about the VM in question (e.g., address, software information, hardware information, etc.), the reason for reboot, and/or other relevant information.

In a cloud-first and serverless world, events are the symbolic "glue" connecting the various different aspects of an application or multiple applications. Events can originate from microservices, cloud services, from the network edge, or even from Internet of Things ("IoT") devices. Events fire from infrastructure automation or from application communication. Events can be fired as triggers from data platforms, or as a means to connect complex analytics and artificial intelligence ("AI") services. The sources and consumers (i.e. subscribers) of events are numerous and diverse, extending across clouds (e.g., public and private), and network edges.

An "event source" is typically the system where an action, operation, or other type of occurrence (i.e. an "event") takes place, or rather, where the event happens. As will be described in more detail later, events may be categorized into topics, so that event subscribers can decide appropriately which topics to subscribe to depending on the type of events they are interested in. Topics also provide an event schema so that subscribers can discover how to consume the events.

As described earlier, there may be situations in which an interested entity (i.e. a subscriber or consumer) desires to receive information about an event. Event subscribers are other applications or services that are interested in reacting to events when they receive notifications about those events. As an example, an event subscriber can initially indicate that it is interested in receiving a publication when a particular type of storage file is created at a particular endpoint. Thereafter, the subscriber may react in a particular manner after it receives a notification regarding the event, as will be described in more detail later. Because events are typically generated in an asynchronous manner, the subscriber of the event may not be aware as to exactly when an event will occur. As used herein, the terms event handlers, handlers, event subscribers, and subscribers will be used interchangeably.

According to the disclosed embodiments, an event grid is a construct that interconnects sources with subscribers. From the event grid's perspective, a subscriber is the final place where the events are going and where some further action may take place to successfully process events. As a basic introduction, the event grid supports multiple subscriber types and (depending on the subscriber) the event grid will follow different mechanisms to guarantee the delivery of the event. For example, delivering an event may be repeatedly retried until the handler returns a status code (e.g., status code 200—OK). In the case of storage queuing, an event may be retried until the queue service is able to successfully process the message.

To make that event known to external parties, the source of an event may publish that event via an event publication. An event publication is a broadcast sent to one or more entities. Using the example discussed above, an event publication can be a publication indicating that a file has been created. The event publication may include details about the event, including, for example, when the event transpired or when the publication was created, what type of event occurred, what entity initiated the event (i.e. an identification of the publishing service or an identification of which customer account the event publication is associated with), what entities are impacted by the event, a type for the event publication, and/or any other information associated with the event. An event publication may be the event itself, or a summarized version of the event.

In this regard, external entities are able to learn about an event by receiving an event publication which provides details or specifics about the event. As an example, consider a file service running in the cloud. When a new file is created by the file service, an event occurs (i.e. the creation of the new file), and the file service is able to generate an event publication about that event. This file service is able to transmit the event publication to any other services, applications, or entities that may be interested in learning about the file creation.

As a practical example, consider a car insurance application that is configured to allow clients to upload pictures of their cars when their cars get damaged. These pictures will be helpful when filing a claim. The car insurance application may have a front-end client application that is executable on the users' mobile devices. When the users snap photographs of their cars and then upload those photographs using the front-end client application, the front-end client application executes a photo upload event in which a photo file is created in the cloud. To notify the car insurance application of a pending claim, an event publication corresponding to the photo upload event can be delivered to the car insurance application. In this manner, the car insurance application is notified when a claim is pending and can begin a "claim processing" phase.

With that said, attention will now be directed to FIG. 1, which shows an example of a client 100 that is able to configure a service (shown in later figures) so that the service will be able to generate event publications. As shown in FIG. 1, the client 100 may take on many different forms. For example, the client 100 may be a user portal 105 (i.e. a user interface) which a human user is able to interact with to configure the service. The client 100 may also be a command line tool 110. Alternatively, the client 100 may be a software application 115 that is able to independently communicate and configure a service. The ellipsis 120 demonstrates that the client 100 may take on other forms and is not limited simply to the forms shown in FIG. 1.

Figure 2:
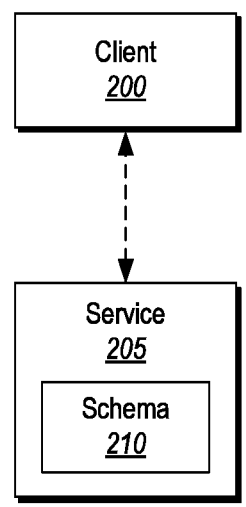
FIG. 2 illustrates how a client is able to interact with a service (e.g., a cloud-based service).

FIG. 2 shows a client 200, which is an example implementation of the client 100 from FIG. 1. Here, client 200 is communicating with a service 205. It will be appreciated that service 205 may be any type of service. As examples only, the service 205 may be an email service, a calendar service, a data storage service, a social networking service, a document service, a backup service, a financial service, a health care service, a government service, or any other type of service.

As shown, service 205 includes its own data formatting schema (i.e. schema 210). As used herein a "schema" (e.g., schema 210) represents how an entity (e.g., service 205) organizes and formats the data that it operates on. For example, schema 210 symbolically represents service 205's data blueprint or a database structure.

Figure 3:
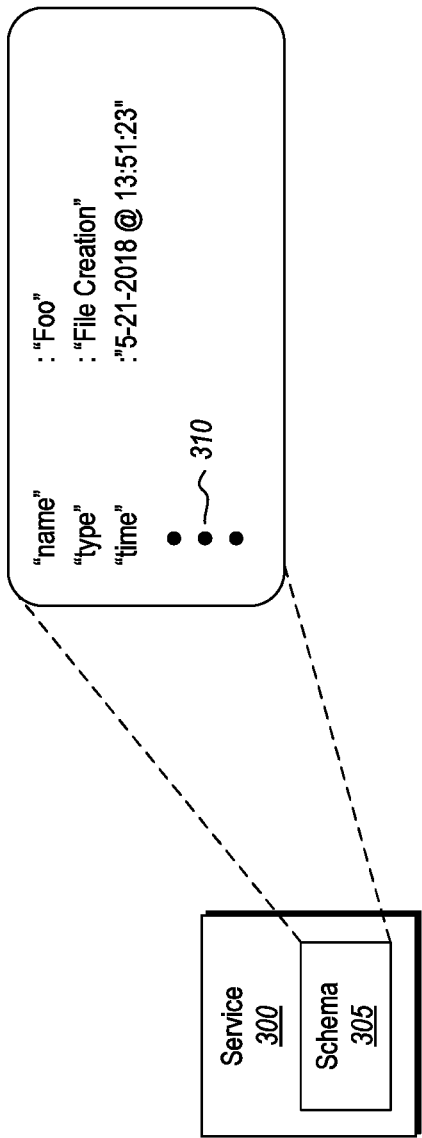
FIG. 3 provides additional details on the format of the service's input/output schema.

FIG. 3 shows more detail about a schema (aka a formatting technique). In particular, FIG. 3 shows a service 300, which may be an example implementation of the service 205 from FIG. 2, and a schema 305, which may be an example implementation of the schema 210. As shown, the schema 305 includes a number of data fields (e.g., "name," "type," and "time."). The ellipsis 310 demonstrates that the schema 305 may have any number of data fields and is not limited simply to those shown in FIG. 3.

In this example scenario, service 300 is operating on data in which the "name" data field is populated with the name "Foo," the "type" data field is populated with the type "File Creation," and the "time" data field is populated with the time "5-21-2018 @ 13:51:23." Of course, these are example data values and should not be considering as limiting. Service 300 may operate using many different instances of schema 305 such that each instance includes isolated data but nevertheless is formatted in the manner required by schema 305.

Registering a Service

Figure 4:
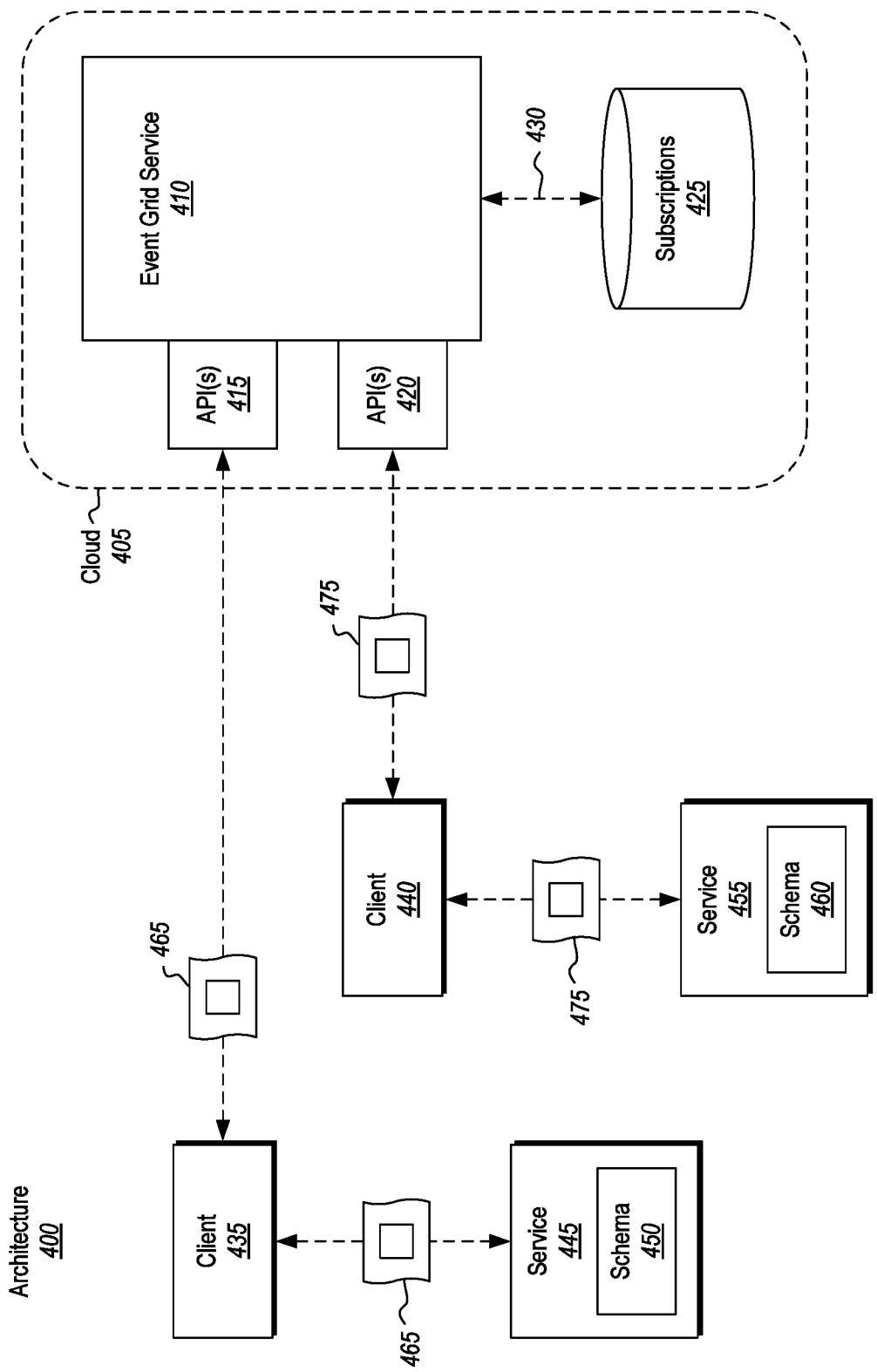
FIG. 4 illustrates an example architecture in which different clients are registering services with a centralized event grid service.

In many instances, it is desirable to push event publications to a centralized service (i.e. the event grid) so that the centralized service can then (1) organize those event publications, (2) filter out any particularly relevant information, and (3) push the relevant information to an interested entity. Such a configuration is shown in FIG. 4 by architecture 400.

In particular, architecture 400 includes a cloud 405 and a centralized event grid service 410 operating in the cloud 405. The event grid service 410 includes any number of application program interfaces (APIs), such as, for example, API 415 and API 420. APIs 415 and 420 are operational constructs (e.g., tools, routines, protocols, etc.) that may be exposed to a client to enable the client to initially register a publishing service with the event grid service 410, as will be described in more detail below.

The event grid service 410 is also associated with a subscriptions database 425. The subscriptions database 425 may be included on the same node that is operating the event grid service 410, or the subscriptions database 425 may be located on a different node, but is accessible by the event grid service 410. Regardless of where the subscriptions database 425 is located, the event grid service 410 is able to pass registration data 430 to the subscriptions database 425 for storage. As a brief introduction, a subscription provides instructions on which events for a topic a subscriber is interested in receiving. A subscription is also the artifact that holds configuration data regarding how events should be delivered to a subscriber.

The architecture 400 also includes client 435 and client 440. Clients 435 and 440 may be example implementations of client 200 from FIG. 2. The architecture 400 also includes service 445, with its corresponding schema 450, and service 455, with its corresponding schema 460. These services and schemas may be example implementations of the service 300 and schema 305 from FIG. 3.

As described earlier, it is often desirable to configure a service so that the service transmits event publications to an external entity. In this case, the services 445 and 455 are being configured by the clients 435 and 440 respectively so that the services 445 and 455 will transmit or "push" event publications to the event grid service 410. To do so, the event grid service 410 initially exposes its APIs 415 and 420 to the clients 435 and 440 respectively so that a topic can be created for organizing the event publications.

According to the disclosed embodiments, services push event publications to the event grid service 410 based on an established "topic." As used herein, a "topic" is a configurable subject area that provides an initial basis for understanding what an event is related to. Examples of topics include, but are not limited to, a topic for a particular service (e.g., all events for that service are categorized (or belong) to that topic), a topic for a particular customer (e.g., all events from a customer are categorized to that topic), a topic for a particular type of event (e.g., all events of a particular type, regardless of when or where those events originated, are categorized to that topic), a topic for a group of services, customers, and/or events, just to name a few. These are just examples, and the broader principles should apply.

Using client 435 as an example, during the initial registration of service 445 with event grid service 410, client 435 is able to use API 415 to learn how event grid service 410 operates. For example, client 435 is able to learn what type of schemas event grid service 410 uses for a particular topic. Similar to how service 445 includes its schema 450, event grid service 410 is also configured to operate using one or more different schemas for each topic. Because event grid service 410 is a centralized service, it is desirable to enable event grid service 410 to operate using many different schemas (e.g., one (though possibly more) for each topic). In this manner, event grid service 410 may operate using different conforming schemas, such as, for example, a cloud event schema, an event grid schema, or any other type of schema.

In some instances, the schemas used by event grid service 410 may be different than schema 450 of service 445. When that is the case, then client 435 is able to acquire schema information 465 from service 445 and transmit the schema information 465 to the event grid service 410. The client 440 may perform similar operations by transmitting schema information 475 to the event grid service 410.

Once event grid service 410 acquires the schema information 465 and/or 475, then event grid service 410 can perform a number of different operations to map the schemas 450 and 460 to one of the schemas (or even a new schema) used by event grid service 410.

In a first instance, a human developer can manually perform a mapping to map or correlate the schemas used by the services to the schemas used by the event grid service 410. Using FIG. 3 as an example, the human developer can map the "name," "type" and "time" data fields to comparable fields that are used by the event grid service 410.

In another instance, event grid service 410 is able to intelligently analyze the data fields in the services' schemas and programmatically/automatically derive a mapping, similar to how the human developer might perform this correlation. In some embodiments, automatically deriving the mapping may be performed by analyzing one or more attributes of the publishing service and then constructing the mapping so that it is based, at least in part, on these attributes. Such a process is particularly beneficial because it is highly efficient. When event grid service 410 performs its intelligent mapping, then it may also generate a level of confidence metric for each of the mapped data fields. These probability metrics (i.e. the level of confidence metrics) may be provided to a human developer for review to perhaps verify or approve the accuracy of the mapping.

In another instance, event grid service 410 may perform an initial mapping for a subset of the data fields. Then, for data fields which event grid service 410 was either (1) not able to map or (2) did map but the probability metrics were below a predetermined acceptable threshold value, then event grid service 410 is able to deliver those data fields to a human developer to finish the mapping process. As such, event grid service 410 may rely on the probability metrics to determine when additional consultation is required.

In yet another instance, event grid service 410 is able to perform machine learning on any existing schemas as well as on any new schemas that it acquires. In other words, automatically deriving the mapping may be performed by (1) determining that one or more existing mappings are currently available for use (which were derived at a previous time), (2) learning attributes of those existing mappings, and then (3) deriving a new mapping based on the learned information.

For example, the subscriptions database 425 may include a table with information on all of the past schemas that the event grid service 410 previously used or was aware of. By performing machine learning on this information, event grid service 410 may be able to provide a more intuitive and/or more accurate mapping between the services' schemas and the schemas used by event grid service 410. In this manner, any new mappings that are generated may serve as templates for future actions and/or for future learning situations.

While the scenario shown in FIG. 4 illustrates a client (e.g., clients 435 and 440) acting as a middleman between event grid service 410 and certain endpoint services (e.g., services 445 and 455), this may not always be the case. For example, in some situations, a service may be able to communicate directly with event grid service 410 to perform this initial registration process so that the mapping can be derived. Therefore, in such scenarios, the middleman client can be avoided, and the registration process can be optimized even further.

The end result of the registration process (generally described in FIG. 4) is a mapping that maps a schema used by a service to a schema used by the event grid service. Of course, it will be appreciated that if the service's schema conforms with the event grid service's schema, then this mapping derivation process can be avoided. Regardless, FIG. 5 shows an example of this end result.

Figure 5:
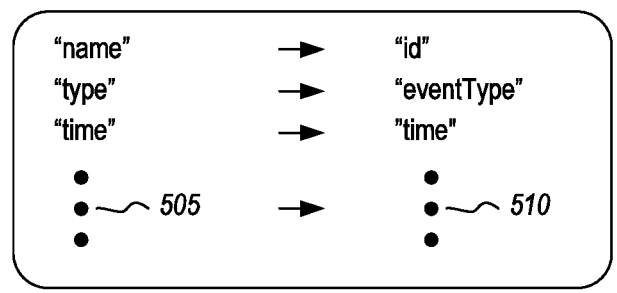
FIG. 5 demonstrates how a mapping can be derived in order to translate/correlate/map the service's schema, which may be a non-conforming schema, into a new schema that is conforming and that is operable by the event grid service and/or a particular subscriber.

In particular, FIG. 5 shows an end map per topic 500. It will be appreciated that during the registration process, a new topic may be created, and the event grid service may use a particular schema for that new topic. As such, during the registration process, a new mapping may be formed for that new topic so that the service's schema properly maps to the schema used by the event grid service for that particular topic.

Alternatively, during the registration process, an existing topic may be selected (e.g., via a drop down box listing a number of existing topics) such that the event grid service already has a particular schema for that existing topic. When a new service publishes event publications for that topic, then, during the registration process, a new or existing mapping may be created or selected to ensure that the service's schema properly maps to the event grid's schema.

The end map per topic 500 shows that the "name" data field has been mapped to an "id" data field, the "type" data field has been mapped to an "eventType" data field, and the "time" data field has been mapped to the "time" data field. The "name," "type" and "time" data fields correspond to a service's particular schema, and the "id," "eventType," and "time" data fields correspond to the schema used by the event grid service. As shown, these data fields are correlated (i.e. mapped) with each other so that actual event data which was assigned the "name" data field will now be mapped to the "id" data field. The ellipsis 505 and 510 demonstrate that any number of mappings or correlations may occur. Furthermore, the process of mapping these data fields may be performed in any of a variety of ways, as described earlier.

Routing Architectures

Figure 6A:
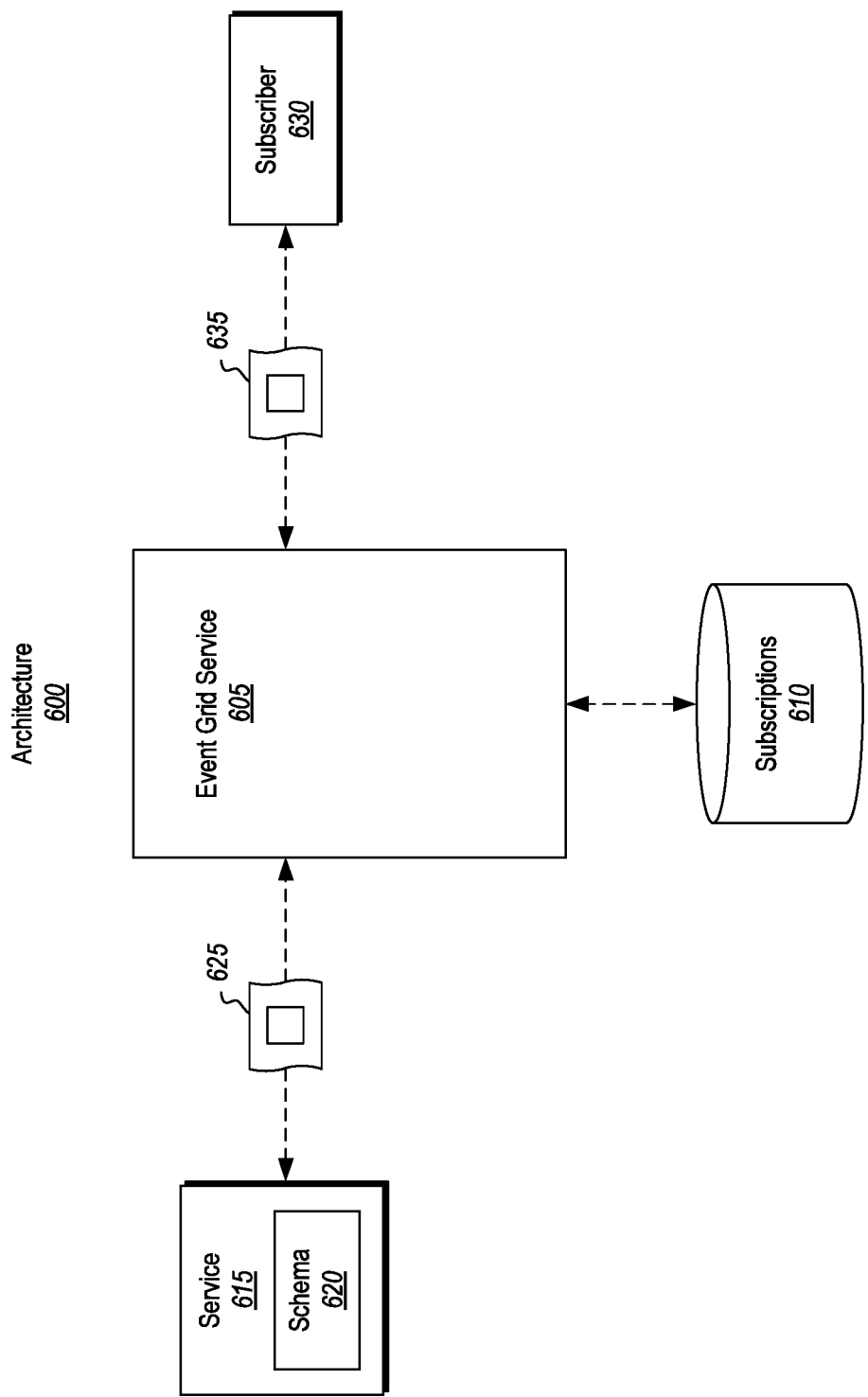
FIG. 6A shows an example architecture in which a subscriber is able to establish a subscription with the event grid service in order to receive event publications issued by any number of services.

Attention will now be directed to FIG. 6A which shows an example architecture 600 that may be used to push event publications to interested external entities. Architecture 600 includes an event grid service 605, which may be an example implementation of event grid service 410 from FIG. 4, and a subscriptions database 610, which may be an example implementation of subscriptions database 425. Architecture 600 also includes service 615 with a schema 620, which may be an example implementation of service 445 and schema 450 respectively.

In addition to those entities/constructs, architecture 600 also includes a subscriber 630 (i.e. an end consumer of the event data). Here, subscriber 630 is an entity that is interested in receiving information about one or more topics. The service 615 pushes an event publication 625 to event grid service 605, where the event publication 625 is associated with an established topic. In this example, subscriber 630 is interested in acquiring certain event data corresponding to this topic.

In other words, subscriber 630 has a subscription for the topic. To facilitate the process of pushing event data to subscriber 630, event grid service 605 maintains information about the subscription in the subscriptions database 610. In this manner, event grid service 605 will able to push only relevant event data to subscriber 630. As used herein, "relevant" event data is data that conforms to a specified event data type for which subscriber 630 is interested in learning about. To clarify, subscriber 630 may not be interested in receiving all of the event data published for the topic. Instead, subscriber 630 may desire only a subset of the event data. As such, subscriber 630's subscription is able to specify which types of event data subscriber 630 desires to be notified of, and these criteria are stored in the subscriptions database 610.

As will be described in more detail later, event data in the event publication 625 may be translated by the service 615 or even by the event grid service 605 so as to conform to a schema used by event grid service 605 for that particular topic. In any event, the event grid service 605 eventually receives event data in an appropriate format/schema, which was selected for the corresponding topic.

Subsequently, one or more portions of the received event data 625 is then pushed to subscriber 630 as shown by data 635. In this manner, event grid service 605 acts as a centralized event publication repository that is able to receive event publications (including event data), process those publications, and then deliver relevant information from those publications to one or more subscribers who are interested in receiving event data corresponding to a particular topic.

Figure 6B:
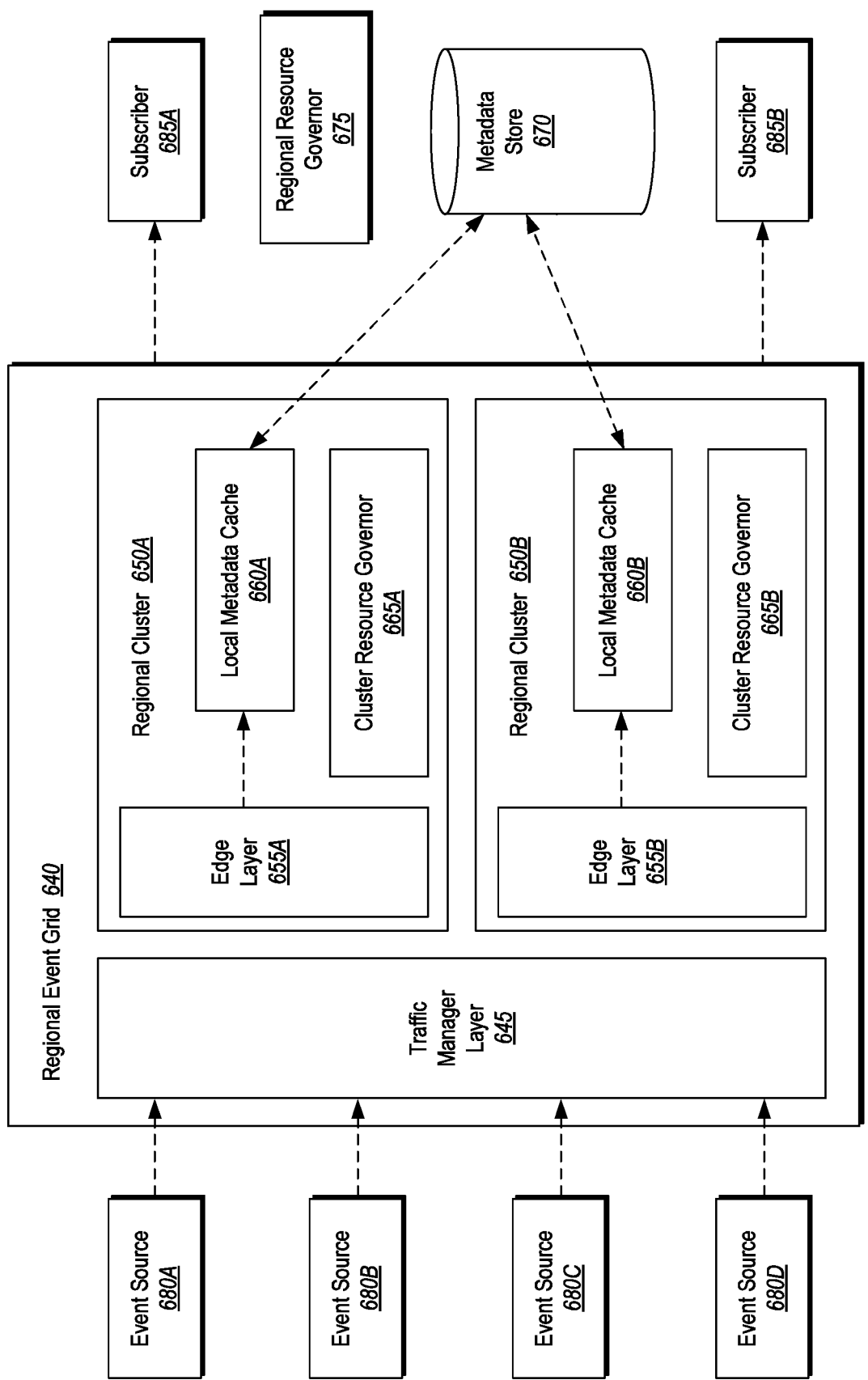
FIG. 6B shows an example architecture that provides transparent scale out and failover capabilities for users by providing a set of clusters of compute and storage resources that work in tandem to provide processes related to mapping and topic management.

FIG. 6A presented a focused architecture that is able to maintain the subscription information for any number of subscribers. FIG. 6B presents an expanded, or rather an enlarged, version of an overall architecture that is representative of the architecture in FIG. 6A. In particular, the architecture in FIG. 6B focuses not only on interconnecting sources with subscribers, but also on ensuring that the subscription data is adequately secured/safeguarded so that the subscription information will not be lost in the event of a failure.

As shown, FIG. 6B includes a regional event grid 640, comprising an alternative configuration to the architecture 600 shown in FIG. 6A, and which is able to provide similar functionality to the functionality provided by architecture 600. In this regard, regional event grid 640 is similar to or analogous to the event grid service 605 from FIG. 6A.

As shown, regional event grid 640 includes various different components, such as a traffic manager layer 645, a first regional cluster 650A, and a second regional cluster 650B. The first regional cluster 650A includes an edge layer 655A, a local metadata cache 660A, and a cluster resource governor 655A. The second regional cluster 650B includes similar components, such as an edge layer 655B, a local metadata cache 660B, and a cluster resource governor 665B. The regional event grid 640 is able to communicate with a metadata store 670, which is included as a part of the regional event grid 640 and/or which is incorporated into a separate/remote entity.

The metadata store 670 is a component that authoritatively stores any of the following information: (1) topic information, including schemas for a topic; (2) authorization information for event sources; and/or (3) subscriptions and their configurations. In some implementations, the metadata store 670 may be a fully partitioned, distributed service with all its data replicated in any number of other regions.

In some embodiments, the regional clusters 650A and 650B utilize a share nothing architecture, which includes replicated databases that are self-reliant/non-mutually dependent. As a result, the regional clusters 650A and 650B may each have their own respective local metadata cache 660A and 660B, respectively. These caches, in some embodiments, have a full cache of the metadata store 670 co-located with the edge layers 655A and 655B, respectively. This durable cache (i.e. local metadata caches 660A and 660B) may be continuously synced up with the metadata store 670. The local metadata caches 660A and 660B may also be partitioned to scale out to any number of queries that the edge layers 655A and 655B might issue. Additionally, the local metadata caches 660A and 660B may be indexed or otherwise organized so that event routing is as fast as possible even when a large number (e.g., multiple millions) of subscriptions are established.

The edge layers 655A and 655B, in some embodiments, are responsible for receiving events from event sources (e.g., event sources 680A, 680B, 680C, and 680D) and reliably deliver the events to any interested subscribers. In some embodiments, the edge layers 655A and 655B process events by performing any combination of the following operations: (1) safely storing events on disks and replicating the events to prevent event losses; (2) routing or filtering events based on the subscriptions present in the system; and/or (3) delivering the events to the interested subscribers.

In some instances, the traffic manager layer 645 is used to route communications, such as in instances when the event sources (e.g., event sources 680A, 680B, 680C, and 680D) do not directly publish to a regional cluster (e.g., regional clusters 650A and 650B). Instead, in such instances, the event sources communicate through the traffic manager layer 645. This level of indirection allows for flexibility in adding and removing extra clusters in the regional event grid 640, as required or as needed.

In some embodiments, edge nodes in the regional clusters 650A and 650B may emit resource metrics and/or other statistics to the cluster resource governors 665A and 665B. These governors, in some embodiments, apply a set of predetermined rules, based on the received metrics, to take appropriate actions (e.g., altering performance of system components) to keep service quality as high as possible, or to at least meet a predetermined service quality that is specified by an existing service level agreement (SLA). For example, some of the metrics include, but are not limited to CPU usage, memory usage, and event queue length, just to name a few. Some of the possible actions the cluster resource governors 665A and 665B can take include, but are not limited to: ordering individual nodes to drop connections to balance connections; removing nodes; and/or causing nodes to no longer take on new work or to process new traffic.

Similar to the cluster resource governors 665A and 665B, the regional resource governor 675 may receive aggregated metrics from any of the regional clusters (e.g., regional clusters 650A and 650B) and then, based on the aggregated metrics, configure the traffic manager layer 645 to balance the load among the regional clusters (e.g., regional clusters 650A and 650B), as required to satisfy an existing SLA.

With the design of multiple, share nothing regional clusters (e.g., regional clusters 650A and 650B), plus the traffic manager layer 645, the regional event grid 640 is able to provide high availability for local failures in any geopolitical region. Furthermore, the regional event grid 640 is designed to provide a transparent fail over in the case of full loss.

In some embodiments, this is achieved by pairing one regional event grid with another regional event grid. For example, suppose there is a regional event grid located in the south-central area of the United States (USSC) and further suppose there is a regional event grid located in the north-central area of the United States (USNC). By pairing these two regional event grids together, the embodiments are able to ensure a secure failover system.

To "pair" one regional event grid to another regional event grid, the following operations may be performed. One operation is that the scope for a particular metadata store (e.g., metadata store 670) is geo-paired such that it is no longer simply regional. Using the above example, all (or some) subscriptions for USSC and USNC can be combined into another backup metadata store service (e.g., metadata store USSC_USNC).

Another operation includes syncing the subscriptions from a number of regional clusters to the "geo-pair" from the combined metadata store. With regard to the above example, all (or some) regional clusters (e.g., regional clusters 650A and 650B) in USSC and USNC will locally cache the subscriptions defined in the metadata store USSC_USNC.

Another operation includes configuring the traffic manager layer 645 in such a way that event sources (e.g., event sources 680A, 680B, 680C, and 680D) communicate with regional clusters (e.g., regional clusters 650A and 650B) that are in the same geopolitical region as the sources (e.g., event sources 680A, 680B, 680C, and 680D). However, in the case of a regional failure, the traffic manager layer 645 may be reconfigured to redirect all traffic to an available region in the geo-pair. In this manner, all of the subscribers' subscription data may be preserved.

Accordingly, the event-driven architectures shown in FIGS. 6A and 6B provide many benefits, as outlined above and as further outlined below. One benefit includes expanding the list or availability of services that are able to natively integrate (i.e. no alterations need be made to their native schemas) with both the event grid and with subscribers. Another benefit includes the ability to embrace any number of different standards, which directly allows for cross-cloud and cross-subscriber/publisher interoperability.

Yet another feature provided by the disclosed embodiments relates to dead-lettering. For example, despite best intentions, scenarios may arise when an event meant for a specific destination cannot be delivered due to problems with the event itself or with the recipient/subscriber. Such "lost" events (i.e. "dead-letters") can be a concern especially if there is a business-critical process relying on this delivery. To alleviate this, the event grid provides support for dead-lettering which helps ensure that subscribers will eventually receive the events that they are interested in. For example, if the event grid is unable to deliver an event after retrying for a specified period (e.g., minutes, hours, days, etc.), then the event may be placed in a storage account, which can be analyzed later or which can be monitored for live-tracking of failed deliveries.

In this manner, the event grid can act as an event router or middleman for applications and subscribers. For instance, applications can use the event grid as an event router for streams of events generated by the application itself by (1) creating one or more topics to publish events to, (2) creating subscriptions as needed to react to events, (3) publishing events to the corresponding topics, and (4) processing events in the event handlers as appropriate.

Applications can also use the event grid for subscribing to events from cloud services. In some embodiments, this is achieved by (1) subscribing to a topic to receive events from the interested resource, and (2) processing events in the event handlers as appropriate.

As shown above, in some embodiments, the event grid is a regional service with transparent scale out and failover capabilities for users. In some regions, the event grid is represented by a set of clusters of compute and storage resources. These clusters work in tandem to provide a transparent scale out and failover model. Accordingly, the example architectures shown in FIGS. 6A and 6B describe an event grid service that is able to interconnect sources with subscribers.

Front-End Translation Architectures

Figure 7:
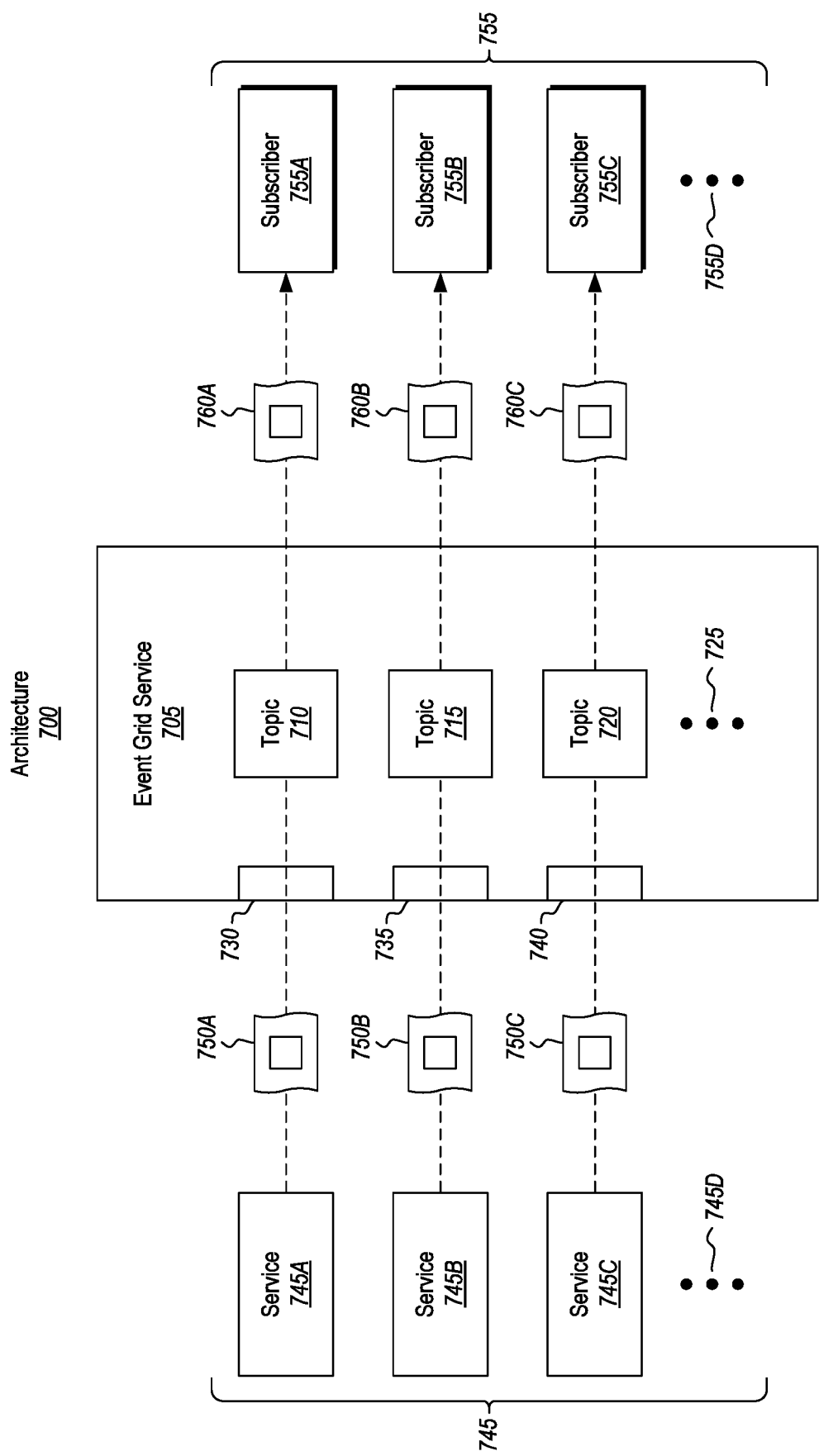
FIG. 7 shows an example architecture in which services are pushing event publications to the event grid service, where the event publications are specific to certain topics, and in which subscribers are receiving information about those event publications.

Attention will now be directed to FIG. 7 which shows an architecture 700 that is similar to architecture 600 from FIG. 6A. Specifically, architecture 700 illustrates that event grid service 705 may handle any number of topics. For example, event grid service 705 is processing event data for topic 710, topic 715, and topic 720. The ellipsis 725 demonstrates that event grid service 705 may handle information for any number of different topics (e.g., 1, 2, 3, 4, 5, 10, 20, 50, 100, or more than 100 topics). The concept of a topic was described in detail earlier and will not be repeated.

Event grid service 705 is also shown as including a number of mapping components, for example, mapping component 730, mapping component 735, and mapping component 740. As used herein, these mapping components receive event publications from services 745 (e.g., service 745A, 745B, and 745C, the ellipsis 745D demonstrates that any number of services may publish event publications). The mapping components then translate event data included within the publications using a mapping that was derived during the initial registration process for each service and/or topic. As such, each mapping component may be associated with a particular topic so that received event data is translated to the schema used for that particular topic.

For example, service 745A is transmitting an event publication 750A to mapping component 730, service 745B is transmitting an event publication 750B to mapping component 735, and service 745C is transmitting an event publication 750C to mapping component 740. Once the mapping components receive the event publications (which include event data) from the services, then the mapping components ensure that the received event data is processed and formatted in accordance with the schema for each respective topic.

Architecture 700 also shows subscribers 755 (e.g., subscriber 755A, subscriber 755B, and subscriber 755C, and where the ellipsis 755D demonstrates that any number of subscribers may be in communication with and subscribed to event grid service 705). After receiving the event publications (which include event data) from the services 745, event grid service 705 is able to selectively identify/filter relevant portions of the event data for each of the respective subscribers 755.

As shown, event grid service 705 is passing relevant event data 760A, 760B, and 760C to subscriber 755A, 755B, and 755C respectively. In this manner, event grid service 705 is able to receive event data, translate that event data into a desired schema for a particular topic, filter that event data, and then push the filtered event data to interested subscribers. Furthermore, the event grid service 705 is able to receive multiple event publications from multiple different publishing services and handle those publications in a desired manner. As an example, event grid service 705 may be associated with multiple subscribers that each have subscriptions with event grid service 705 such that event grid service 705 is able to push multiple event data to the multiple subscribers.

In some embodiments, some of the data fields can initially be filled with a static value and then later auto-populated with a correct value. For example, a "time" field might initially be static, but when the event publication is ready to be transmitted, then the field can be auto-populated to include the time of the actual event publication. Additionally, or alternatively, event types can be automatically changed or populated. This automatic population need not be performed for all of the data fields and can, instead, be performed for data fields that are suitable candidates for auto-population (e.g., the unique ID, the time, the address, etc.).

Figure 8:
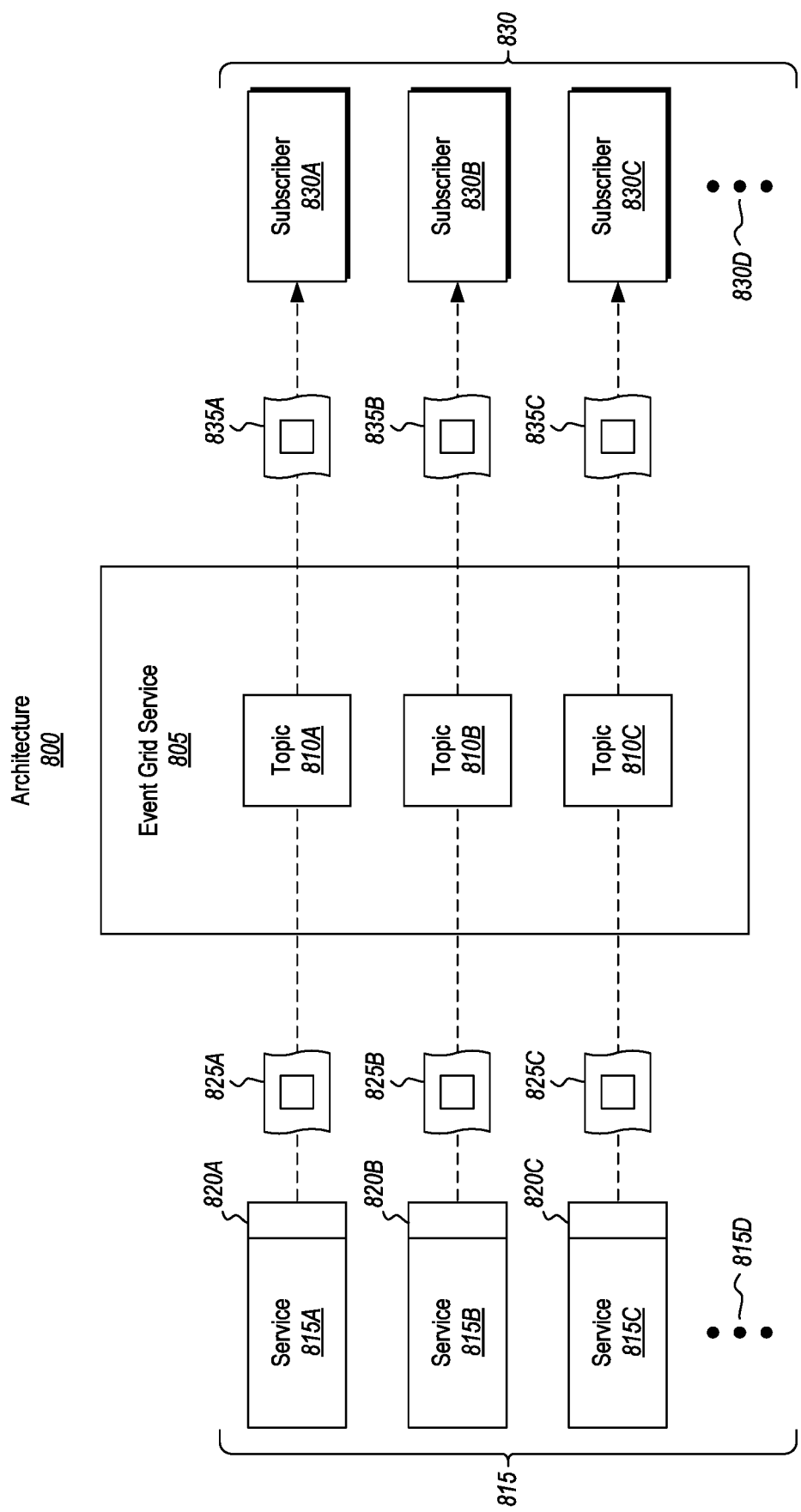
FIG. 8 shows an example architecture where the services are performing translation processes prior to pushing their event publications to the event grid service.

FIG. 8 shows another architecture 800 that is somewhat similar to architecture 700 from FIG. 7. In particular, architecture 800 includes an event grid service 805 with topics 810A, 810B, and 810C. Also shown are services 815 (e.g., services 815A, 815B, and 815C, with the ellipsis 815D demonstrating that any number of services may be present). In contrast to architecture 700 where the event grid service 705 performed the translation process, in architecture 800 the services 815 are configured to perform the translation process.

Recall, during the initial registration process, a mapping was developed to map a service's schema to a schema used by the event grid service 805 for a particular topic. As such, the services 815 are not generating a map, instead, they are simply performing the translation process so that their event data is properly tagged with the data fields of the schema used by the event grid service 805. Therefore, in some embodiments, the services 815 may be configured to perform the translation process whereas in other embodiments an event grid service may be configured to perform the translation process.

After the event data is translated, event grid service 805 is able to transmit relevant event data to the subscribers 830 (e.g., subscribers 830A, 830B, and 830C, with the ellipsis 830D demonstrating that any number of subscribers may be present). Such an operation is shown by the relevant event data 835A, 835B, and 835C being passed to the respective subscribers.

Back-End Translation Architectures

The above discussion focused on embodiments that performed a front-end translation process. In addition to performing a front-end translation, some embodiments are also configured to perform an additional back-end translation process, as shown in FIG. 9.

Here, architecture 900, just like architecture 800 from FIG. 8, includes an event grid service 905 with topics 910A, 910B, and 910C. Services 915 (e.g., services 915A, 915B, and 915C) are pushing event publications 920A, 920B, and 920C (which correspond to respective topics) to event grid service 905. Although not shown, any of the services 915 or the event grid service 905 may have performed a front-end translation process to translate event data into a schema used by the event grid service 905 for a particular topic.

Figure 9:
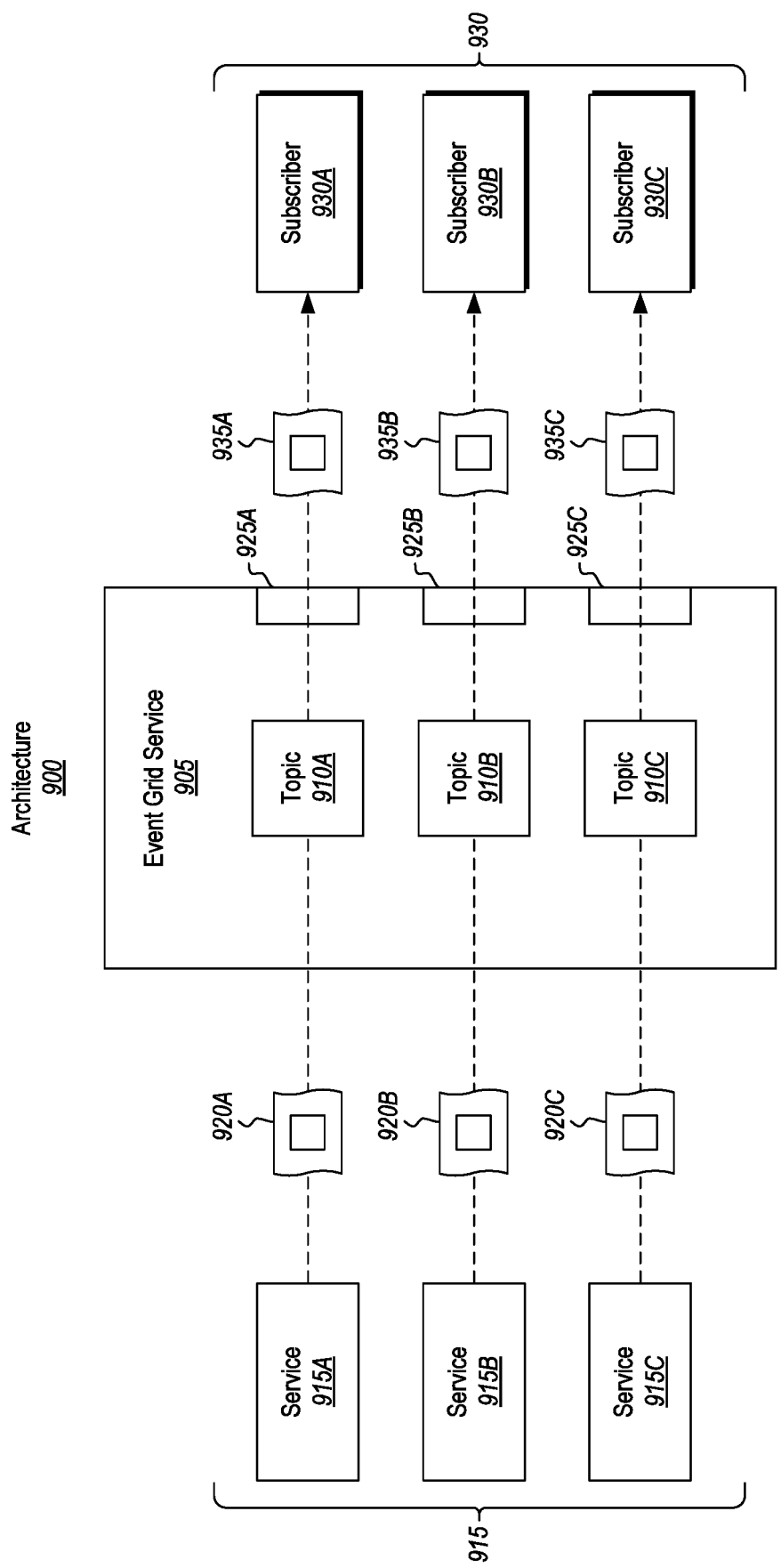
FIG. 9 shows an example architecture where the event grid service is able to perform a back-end translation process prior to pushing event data to the subscribers.

FIG. 9 shows that event grid service 905, in addition to perhaps performing a front-end translation, is also able to perform a back-end translation using mapping components 925A, 925B, and 925C. These mapping components are similar to mapping components 730, 735, and 740 from FIG. 7 with the exception that these mapping components now perform translation processes on the back-end before event data is pushed to the subscribers 930 (e.g., subscribers 930A, 930B, and 930C), as shown by the relevant event data 935A, 935B, and 935C.

While the event grid service 905 may use a particular schema for a particular topic, some subscribers may desire to receive event data formatted in an entirely different schema than either the event grid service 905 or any of the services 915. As such, event grid service 905 is able to perform a back-end translation process to translate the event data into a format that is readable by a particular subscriber. The mapping used for the back end may be derived in a similar manner to the front-end mapping.

Figure 10:
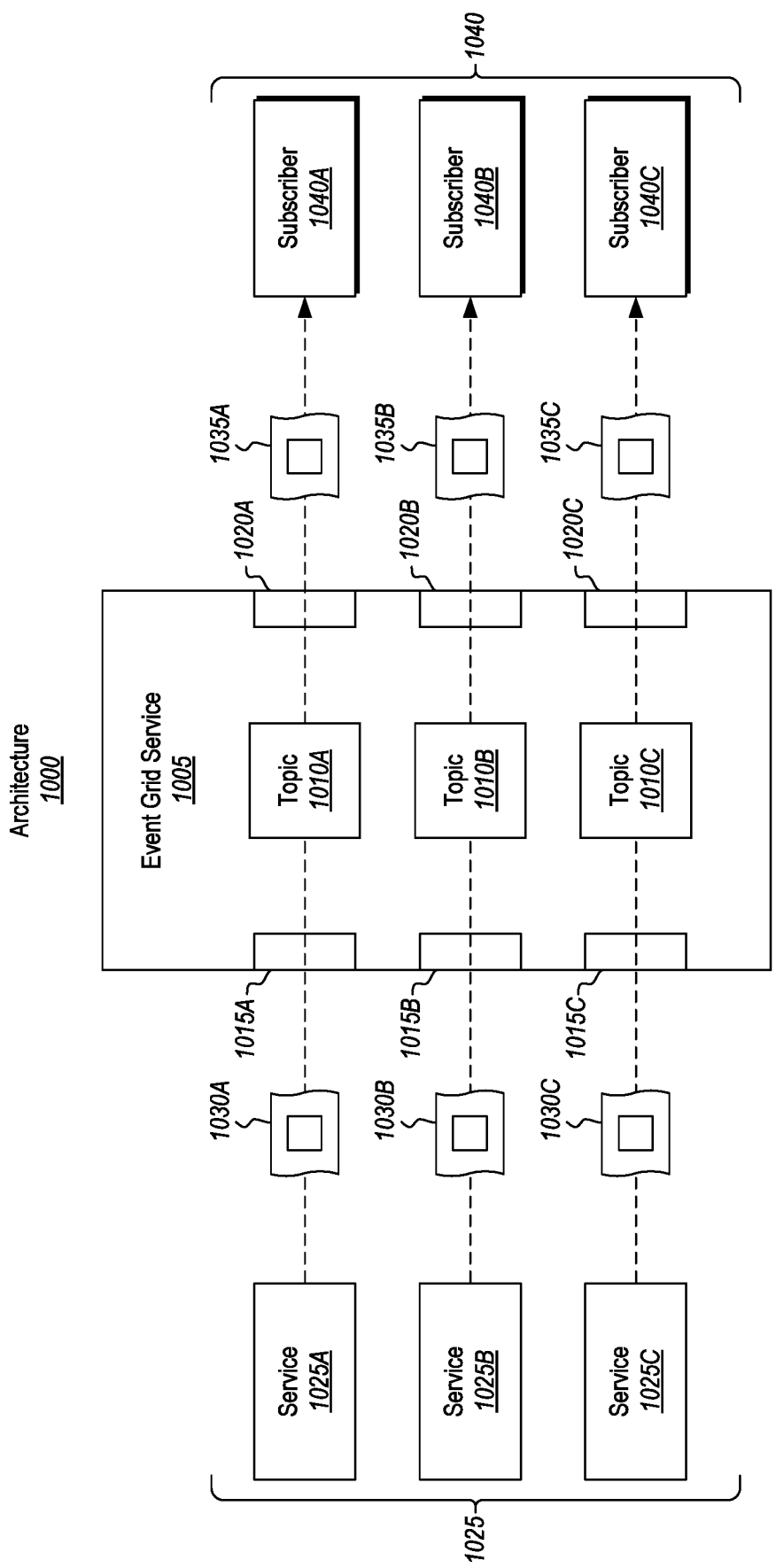
FIG. 10 shows that the event grid service is able to perform both a front-end translation process and a back-end translation process.

With that said, attention will now be directed to FIG. 10 which shows another example architecture 1000. Here, the event grid service 1005 is managing topics 1010A, 1010B, and 1010C. It also includes front-end mapping components 1015A, 1015B, and 1015C, and back-end mapping components 1020A, 1020B, and 1020C.

Here, services 1025 (e.g., services 1025A, 1025B, and 1025C) are pushing event publications 1030A, 1030B, and 1030C to the front-end mapping components 1015A, 1015B, and 1015C respectively. As such, a front-end translation process may occur to translate the event data in each event publication into a desired format/schema.

Subsequently, it may be determined that some subscribers desire to receive relevant data in a different schema that the schema used by the event grid service 1005 for a particular topic. As such, back-end mapping components 1020A, 1020B, and 1020C may perform a back-end translation process to translate the event data into a desired format. Furthermore, the event grid service 1005 is able to selectively filter the event data to identify data that is relevant for a particular subscriber. As shown, the event grid service 1005 is pushing relevant event data 1035A, 1035B, and 1035C to the subscribers 1040 (e.g., subscribers 1040A, 1040B, and 1040C). In this manner, a front-end and/or a back-end translation may occur on event data.

Accordingly, in some circumstances, the event grid service 1005 receives an event publication corresponding to an established topic. Then, event grid service 1005 is able to perform a front-end translation on the event data. Furthermore, the event grid service 1005 is able to determine whether the event data is in a conforming schema for a particular subscriber. If not, then event grid service 1005 is able to perform a back-end translation on the event data. In this regard, prior to pushing any filtered event data to a subscriber, event grid service 1005 can perform a second translation on the event data.

Subscription Variations

Figure 11:
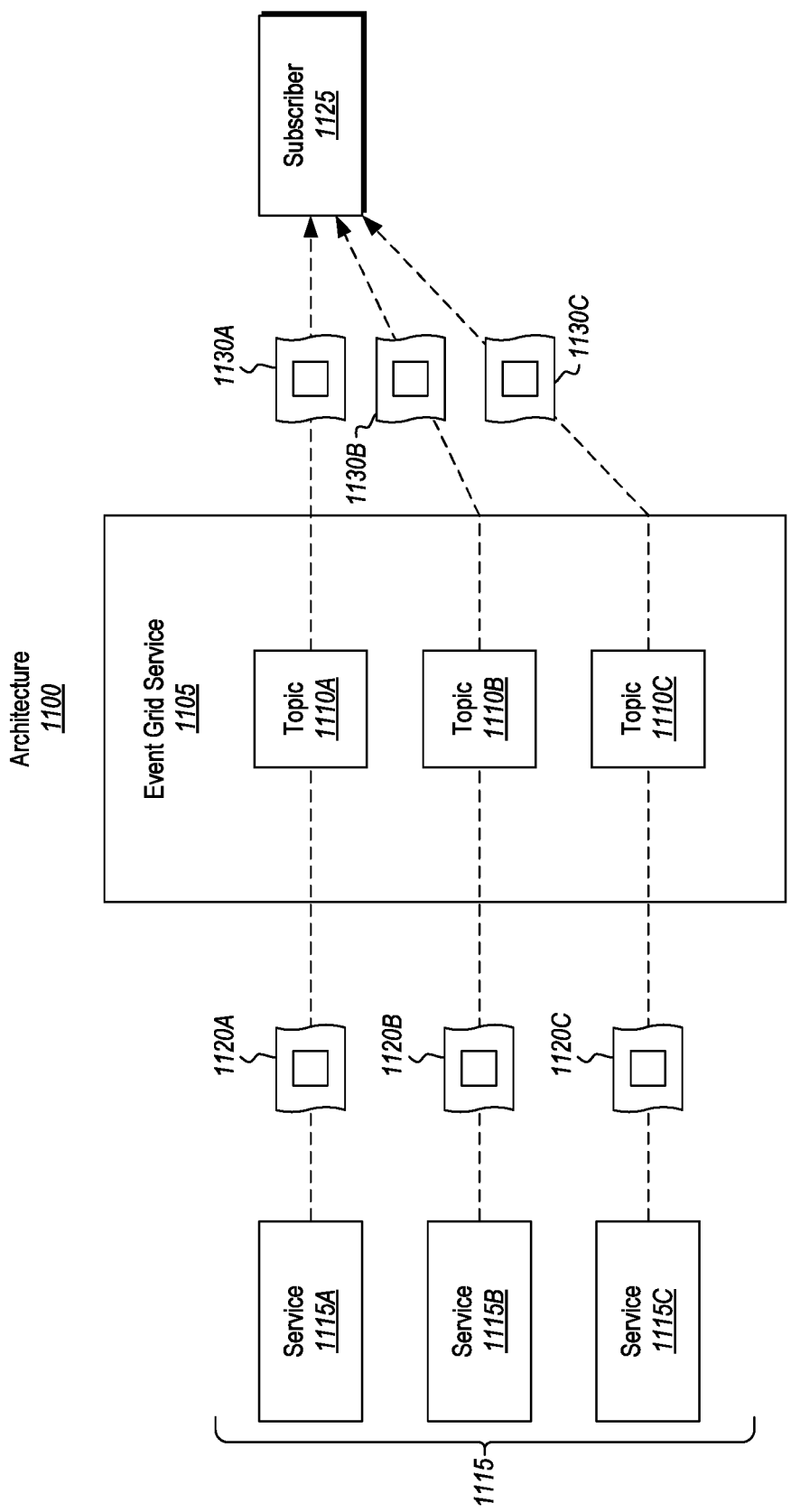
FIG. 11 demonstrates that a single subscriber is able to receive event data corresponding to multiple different topics.

FIG. 11 shows a scenario where a single subscriber can receive information about multiple different topics. In particular, FIG. 11 shows an architecture 1100 where an event grid service 1105 includes topics 1110A, 1110B, and 1110C. Here, services 1115 (e.g., services 1115A, 1115B, and 1115C) are pushing event publications 1120A, 1120B, and 1120C to event grid service 1105 in accordance with the principles described earlier. Furthermore, each of the event publications 1120A, 1120B, and 1120C correspond to a different topic, namely topics 1110A, 1110B, and 1110C respectively.

Also shown is a single subscriber 1125. Although only a single subscriber is illustrated, it will be appreciated that the principles apply to any number of subscribers. Here, subscriber 1125 has multiple subscriptions with event grid service 1105, one subscription for each of the topics 1110A, 1110B, and 1110C. Therefore, because subscriber 1125 has multiple subscriptions, event gird service 1105 will selectively filter the event data received in event publications 1120A, 1120B, and 1120C to identify relevant data in accordance with the subscriber 1125's subscriptions. Thereafter, event grid service 1105 will push relevant data 1130A for topic 1110A, relevant data 1130B for topic 1110B, and relevant data 1130C for topic 1110C to subscriber 1125. In this manner, a single subscriber may receive multiple notifications that correspond to multiple different topics.

Figure 12:
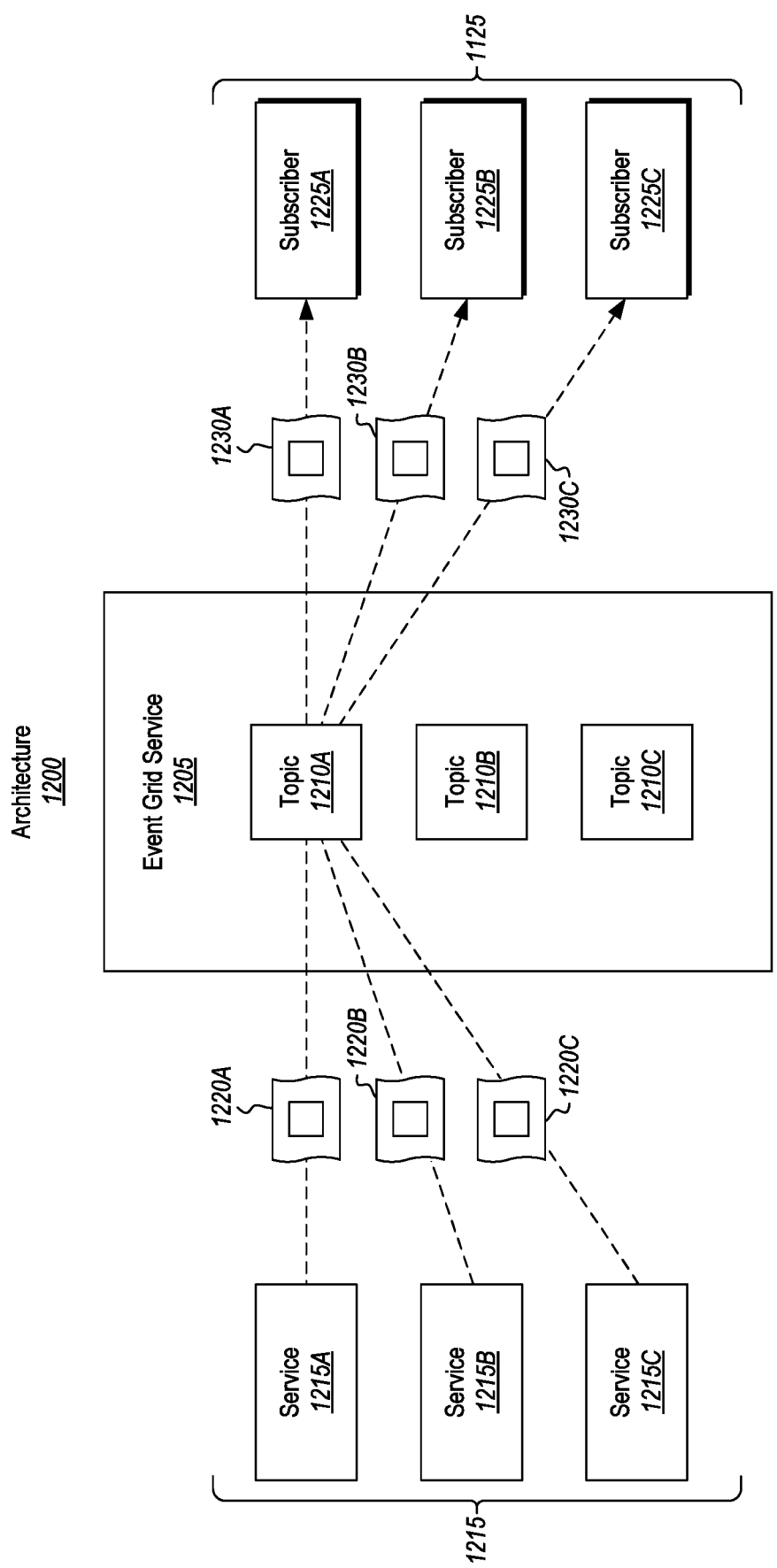
FIG. 12 illustrates that multiple different services are able to publish event data for the same topic and that multiple different subscribers are able to receive event data for that same topic.

FIG. 12 shows an architecture 1200 in which multiple subscribers are all receiving notifications (i.e. event data) about the same topic. In particular, architecture 1200 shows that event grid service 1205 includes topics 1210A, 1210B, and 1210C. The services 1215 (e.g., services 1215A, 1215B, and 1215C) are pushing event publications 1220A, 1220B, and 1220C to event grid service 1205. Here, each of the event publications 1220A, 1220B, and 1220C correspond to the same topic, namely, topic 1210A.

In this example scenario, multiple subscribers 1225 (e.g., subscribers 1225A, 1225B, and 1225C) have subscriptions to receive event data corresponding to topic 1210A. In some instances, the subscribers 1225 will receive the same event data while in other instances the subscribers 1225 will each receive different portions of the event data for topic 1210A. Determining which portions each subscriber will receive is based on the subscriber's corresponding subscription. Therefore, if two subscribers have the same subscription (i.e. the subscription shows that the subscribers have elected to receive the same kind of relevant event data), then it follows that those two subscribers will indeed receive the same data. Accordingly, event grid service 1205 pushes relevant event data 1230A, 1230B, and 1230C to subscribers 1225A, 1225B, and 1225C, respectively.

When multiple subscribers are subscribed to the same topic, then those subscribers may also use different schemas (i.e. a schema that conforms to a format used by the subscriber). In such a scenario, event grid service 1205 is able to selectively filter event data to extract different portions of the event data, even though those subscribers are subscribed to the same topic. Each portion will be analyzed to verify that it is actually relevant to each of the subscribers. Thereafter, event grid service 1205 pushes the extracted portions of the event data to the subscribers. In this manner, any number of subscribers may be subscribed to the same established topic such that those subscribers will receive some (or all) of the same event data that was provided in the received event publication. If needed or desired, event grid service 1205 can also perform individualized mapping processes to ensure that the data is formatted properly for any of the receiving subscribers/consumers.

At this point, an example will be helpful. Suppose there is a mobile phone application, such as the insurance company application that was discussed earlier. In some instances, a client may decide to upload a picture (e.g., of a damaged car) for an insurance claim. From the mobile phone, the image is uploaded to a service running in the cloud (e.g., a cloud storage service). When the file for the picture gets created on the cloud storage, the cloud storage service will publish the creation of the file (i.e. an event) to the event grid service. The publication can describe the customer information, the picture, and other information. As such, the cloud storage service can be a backend application of the insurance company's main application. In other words, the publishing service (e.g., the cloud storage service) is a sub-component of the main application (i.e. the subscriber).

Once the backend application submits the event publication, then the main application may be notified that the client has uploaded an image of the car. Thereafter, the main application can start processing the claim. As such, the service and the subscriber (i.e. the main application) can be owned by the same enterprise or even by the same tenant.

As another example, consider a scenario where a business hires a new employee. Hiring the new employee may trigger the execution of any number of different events. For example, the new employee may need a new chair, desk, or computer. As such, a service may react to the hiring of the new employee by creating events (e.g., a new chair event, a new desk event, a new computer event, etc.). In this instance, the service may be a non-human program that creates the events. Thereafter, a chair purchasing subscriber may listen for a chair event and, when one is received, may perform a process of acquiring a chair. Similar subscribers may be available for the desk and computer events. Accordingly, these are some real-world examples of how some of the embodiments may be used.

Furthermore, if the services (e.g., the chair service) already has an existing schema for formatting their data, then the embodiments are able to dynamically react to that existing schema by generating a mapping so that those services need not be re-coded or otherwise modified. Instead, a simple registration (e.g., a configuration update) can occur to enable those services to continue operating according to their normal procedures/protocols, and the event grid service is able to dynamically adapt through the use of the newly derived mapping. As such, the embodiments provide a highly scalable model for receiving and publishing event data.

Methods

Figure 13:
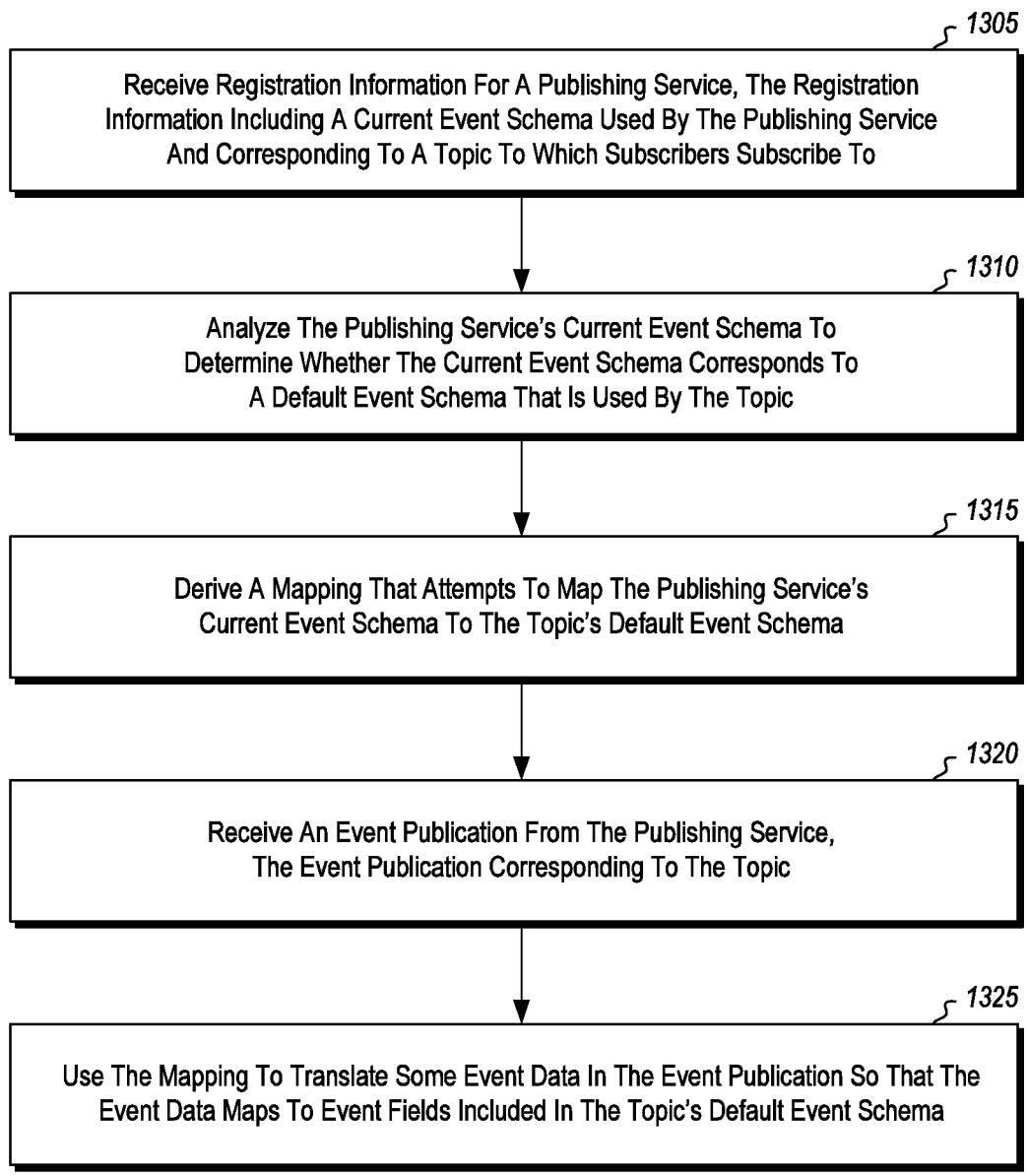
FIG. 13 illustrates a flowchart of an example method for mapping received data that is compiled in a non-conforming data schema to event fields that are included in a conforming data schema.
Figure 14:
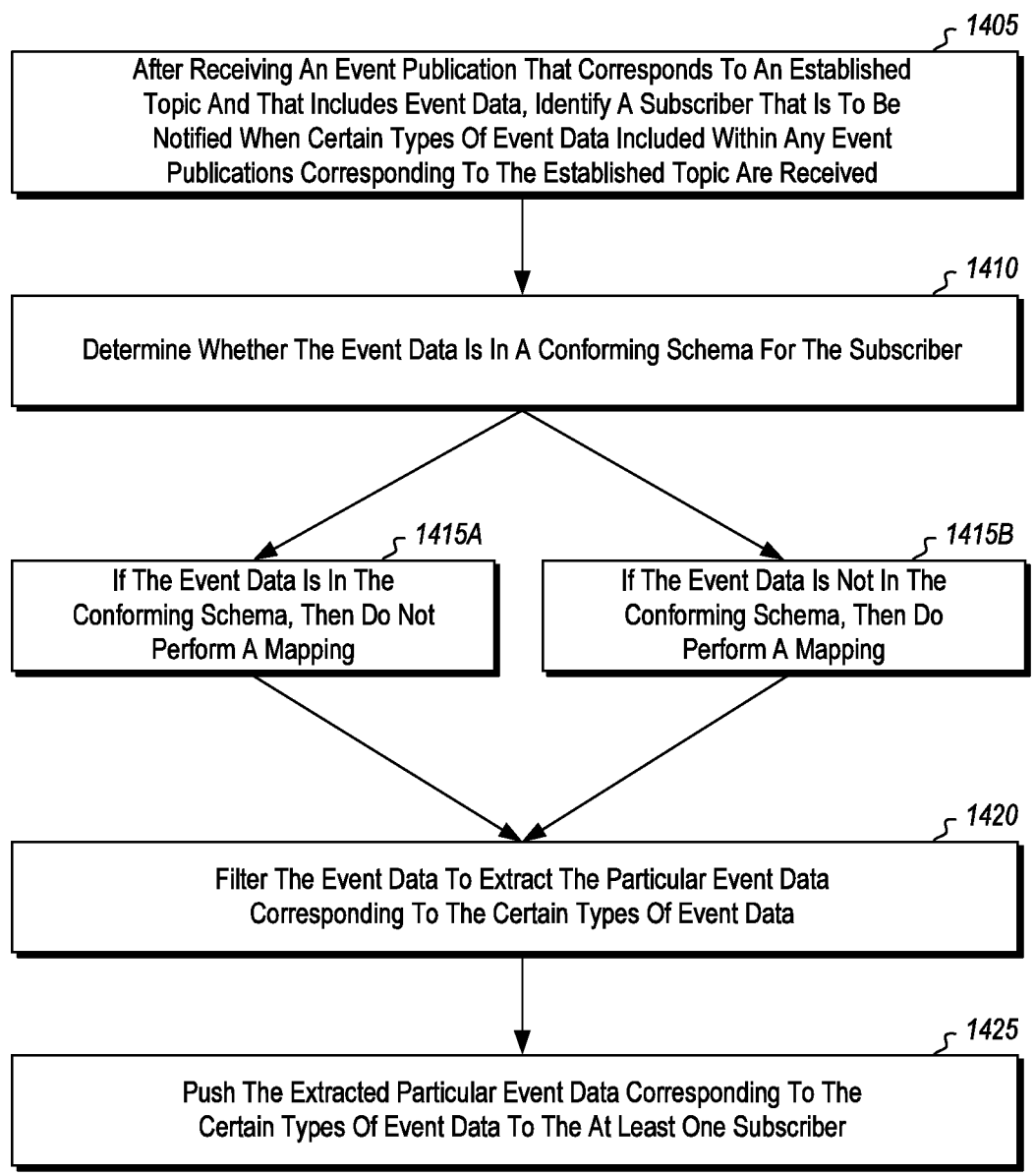
FIG. 14 illustrates a flowchart of an example method for pushing event data received from one or more publishing services to one or more subscribers of topics that correspond to the event data.

Attention will now be directed to FIGS. 13 through 15 which refer to a number of method acts that may be performed. Although the method acts may be discussed in a certain order or illustrated in a flowchart as occurring in a particular order, no particular ordering is required unless specifically stated, or required because an act is dependent on another act being completed prior to the act being performed.

FIG. 13 shows a flowchart 1300 of an example method for mapping received event data that is compiled in a non-conforming data schema to event fields that are included in a conforming data schema. This method may be performed by any of the event grid services discussed herein.

Initially, registration information is received (act 1305). This information is used to register a publishing service (e.g., any of the services 1215 from FIG. 12, services 1115 from FIG. 11, any of the services 1025 from FIG. 10, and so on) with the event grid service. In some circumstances, this registration information includes a current event schema used by the publishing service. Furthermore, this registration information may correspond to a topic to which subscribers subscribe to in order to react to event publications received for that topic.

Subsequently, the publishing service's current event schema is analyzed (act 1310) to determine whether the current event schema corresponds to a default event schema that is used by the topic. If the publishing service's current event schema does not correspond to the topic's default event schema, then a mapping is automatically derived (act 1315) that attempts to map the publishing service's current event schema to the topic's default event schema.

After the mapping is derived, an event publication is received (act 1320) from the publishing service. Notably, this event publication corresponds to the topic for which the service was registered to and for which the subscriber is listening to.

The mapping is then used (act 1325) to translate at least some event data included in the event publication in a manner so that the event data maps to event fields included in the topic's default event schema. In this manner, front-end translations can be performed to ensure that the event data conforms with a desired format.

While FIG. 13 introduced a number of actions that may be performed between a service and the event grid service, FIG. 14 illustrates a flowchart 1400 of a method for pushing event data received from one or more publishing services to one or more subscribers of that event data. In other words, these method acts occur between the event grid service and a subscriber that will react to event data. Similar to the method in FIG. 13, the method in FIG. 14 is also performed by the event grid service, which may be executing on a computer system (e.g., the computer system described later in FIG. 16).

Initially, at least one subscriber is identified (act 1405). This act may be performed after receiving an event publication that corresponds to an established topic and that includes event data. In this scenario, the subscriber is to be notified when certain types of event data included within any event publications corresponding to the established topic are received. As such, the subscriber has a subscription with the event grid service, and the subscription identifies the certain types of event data. It follows then that the event data provided in the received event publication includes particular event data corresponding to the certain types of event data.

Subsequently, a determination is made (act 1410) as to whether the event data provided in the received event publication is in a conforming schema for the subscriber. If the event data is in the conforming schema (act 1415A), then no mapping is performed on the event data. Alternatively, however, if the event data is not in the conforming schema (act 1415B) or is only partially in the conforming schema, then mapping is performed to map the event data.

Next, the event data is filtered (act 1420) to extract any event data corresponding to the certain desired types of event data. Finally, the extracted event data (i.e. the event data corresponding to the certain desired types of event data) is pushed (act 1425) to the subscriber.

Attention will now be directed to FIG. 15 which illustrates a flowchart 1500 of an example method for receiving event publications from one or more publishing services and for pushing information included within the event publications to one or more subscribers. In other words, the method acts outlined in flowchart 1500 constitute a hybrid of the method acts described in FIGS. 13 and 14.

Initially, an event publication is received (act 1505). This publication corresponds to an established topic and is received from a publishing service. Similar to the earlier discussions, this event publication also includes event data.

A mapping is then used to translate (act 1515) at least some of the event data. This mapping is associated with both the topic and the publishing service. By performing this translation process, the event data will now map/correlate to fields included within an event schema for the topic.

After translating the event data, a subscriber is then identified (act 1515). This subscriber has elected to be notified when certain types of event data included within any event publications corresponding to the established topic are received. Similar to the earlier discussion, this subscriber has a subscription with the event grid service, where the subscription identifies the certain types of event data. Furthermore, the translated event data includes particular event data that corresponds to the delineated certain types of event data.

The particular event data is then filtered (act 1520) from the event data and then pushed/routed (act 1525) to the subscriber. In this manner, the event grid service is able to receive event data, ensure that the event data conforms to a selected/desired format or schema. Then, the event grid service selectively filters the event data to identify particularly relevant data. The event grid service is able to identify relevant data using the information previously provided by a subscriber, which information indicates the type of event data that the subscriber views as being important or relevant. Therefore, using this information, the event grid service is able to extract any relevant event data and then pass/route that event data to the subscriber.

Example Computer System

Having just described the various features and functionalities of some of the disclosed embodiments, the focus will now be directed to FIG. 16 which illustrates an example computer system 1600 that may be used to facilitate the operations described herein. The computer system 1600 may take various different forms. For example, the computer system 1600 may be embodied as a server, a distributed system, a desktop, laptop, a mobile phone, a data center, and/or any other computing device.

In its most basic configuration, the computer system 1600 includes various different components. For example, FIG. 16 shows that computer system 1600 includes at least one processor 1605 (aka a "hardware processing unit"), and storage 1610, which may include executable instructions 1615. The processor 1605 may be configured to perform any of the method acts that were described above. Although not shown, the computer system 1600 may include ASICs, GPUs, or other types of hardware logic units.

The storage 1610 may be physical system memory, which may be volatile, non-volatile, or some combination of the two. The term "memory" may also be used herein to refer to non-volatile mass storage such as physical storage media. If the computer system 1600 is distributed, the processing, memory, and/or storage capability may be distributed as well. As used herein, the term "executable module," "executable component," or even "component" can refer to software objects, routines, or methods that may be executed on the computer system 1600. The different components, modules, engines, and services described herein may be implemented as objects or processors that execute on the computer system 1600 (e.g. as separate threads).

The disclosed embodiments may comprise or utilize a special-purpose or general-purpose computer including computer hardware, such as, for example, one or more processors (such the processor 1605) and system memory (such as storage 1610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1600 may also be connected (via a wired or wireless connection) to external sensors (e.g., one or more remote cameras, accelerometers, gyroscopes, acoustic sensors, magnetometers, data acquisition devices, etc.). Further, the computer system 1600 may also be connected through one or more wired or wireless networks 1620 to remote systems(s) that are configured to perform any of the processing described with regard to computer system 1600. The computer system may also include a graphics rendering engine that is configured, with the processor 1605, to render one or more user interface elements on a display.

A "network," like the network 1620 shown in FIG. 16, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1600 will include one or more communication channels that are used to communicate with the network 1620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 2105). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The embodiments may be presented in other specific forms without departing from their spirit or characteristics. The described embodiments are to be considered in all respects only as illustrative and not restrictive. The disclosed scope is, therefore, indicated by the appended claims rather than by the foregoing description. All changes which come within the meaning and range of equivalency of the claims are to be embraced within their scope.

What is claimed is:

1. A method for an event grid service to facilitate notification of published events from different event sources to different event subscribers even when the event subscribers and the event sources utilize different event schemas, the method comprising:

exposing a set of APIs (Application Programming Interfaces' to a plurality of different clients associated with different publishing service schemas;

receiving the different publishing service schemas from the different clients through the set of APIs, the different publishing service schemas specifying how different publishing services publish events associated with the different clients;

generating a data field mapping that includes a plurality of mapped data fields, each mapped data field in the data field mapping corresponding to a correlation between at least one data field in a publishing service schema of a publishing service with at least one data field in at least one event grid service schema of the event grid service, wherein generating the data field mapping only occurs upon first determining that the publishing service schema does not correspond to a preexisting event schema that is accessible to the event grid service for a particular topic for which the publishing service is registering to publish event information, and wherein the at least one event grid service schema comprises a default event schema for the particular topic;

generating a level of confidence metric for each mapped data field based on a determined correlation between the at least one data field in the publishing service schema and the at least one data field in at least one event grid service schema;

determining whether any mapped data fields have a level of confidence metric below a predetermined threshold; and completing the data field mapping for any mapped data field having a level of confidence metric below the predetermined threshold using additional mapping inputs.

2. The method as recited in claim 1, wherein the data field mapping is generated in response to the publishing service registering to publish events on an established topic that the event grid service has at least one event grid service schema configured to use for publishing events to subscribers.

3. The method as recited in claim 2, wherein the event grid service comprises a plurality of different event grid service schemas corresponding to the established topic.

4. The method as recited in claim 2, wherein the method further includes generating a separate mapping between a publishing service schema associated with a different topic and the event grid service schema for the different topic.

5. The method as recited in claim 1, wherein generating the data field mapping is based on a previous mapping between the at least one event grid service schema and a different publishing service schema.

6. The method as recited in claim 1, wherein the event grid service schema is a same schema as a schema of a subscriber that subscribes for one or more event notifications based on events published by the publishing service.

7. The method as recited in claim 1, wherein the event grid service schema is a different schema than a schema of a subscriber that subscribes for one or more event notifications based on events published by the publishing service.

8. The method of claim 1, wherein the method further includes receiving a publication of an event from the publishing service and generating a notification of the event that conforms to the at least one event grid service schema based on the data field mapping.

9. The method of claim 8, wherein the event comprises at least one of a file creation event, a directory creation event or a table creation event.

10. The method of claim 8, wherein the event comprises a rebooting of a virtual machine event.

11. The method of claim 8, wherein the event comprises a modification of a previously created file, directory or table.

12. The method of claim 8, wherein the publication of the event includes event information comprising a trigger for the event, a type of the event and a timing of the event.

13. The method of claim 12, wherein the method further includes translating the event information received into a new event notification conforming to the event grid service schema.

14. The method of claim 13, wherein the method further includes translating the new event notification into a plurality of different new subscriber notifications conforming to a plurality of different schemas associated with different subscribers.

15. The method of claim 1, wherein the event grid service receives the different publishing service schemas from the different clients with registration information provided by the different clients when registering the different publishing services to publish the events associated with the different clients.

16. The method of claim 15, wherein the method further includes storing the registration information.

17. The method of claim 16, wherein the method further includes receiving a configuration update from the publishing service subsequent to registering the publishing service and updating the data field mapping based on the configuration update.

18. The method of claim 1, wherein the method further includes using the data field mapping for translating published events from a different publishing service into a format that conforms to the event grid service schema and without performing the generating of the data field mapping when registering the different publishing service.

19. A computing system comprising:

one or more processors; and one or more storage devices having stored computer executable instructions that are executable by the one or more processors to cause the computing system to at least:

expose a set of APIs (Application Programming Interfaces) to a plurality of different clients associated with different publishing service schemas;

receive the different publishing service schemas from the different clients through the set of APIs, the different publishing service schemas specifying how different publishing services publish events associated with the different clients;

generate a data field mapping that includes a plurality of mapped data fields, each mapped data field in the data field mapping corresponding to a correlation between at least one data field in a publishing service schema of a publishing service with at least one data field in at least one event grid service schema of the event grid service, wherein generating the data field mapping only occurs upon first determining that the publishing service schema does not correspond to a preexisting event schema that is accessible to the event grid service for a particular topic for which the publishing service is registering to publish event information, and wherein the at least one event grid service schema comprises a default event schema for the particular topic;

generate a level of confidence metric for each mapped data field based on a determined correlation between the at least one data field in the publishing service schema and the at least one data field in at least one event grid service schema;

determine at least one mapped data field in the data field mapping has a level of confidence metric below a predetermined threshold; and causing the data field mapping to be performed with additional mapping input associated with the mapped data field having a level of confidence metric below the predetermined threshold.

* * * * *